INVENTOR.
William Mynard McConnell

BY Webb, Mackey & Burden

HIS ATTORNEYS

INVENTOR.
William Mynard McConnell
BY Webb, Mackey & Burden
HIS ATTORNEYS

INVENTOR.
William Mynard McConnell
BY Webb, Mackay & Burden
HIS ATTORNEYS

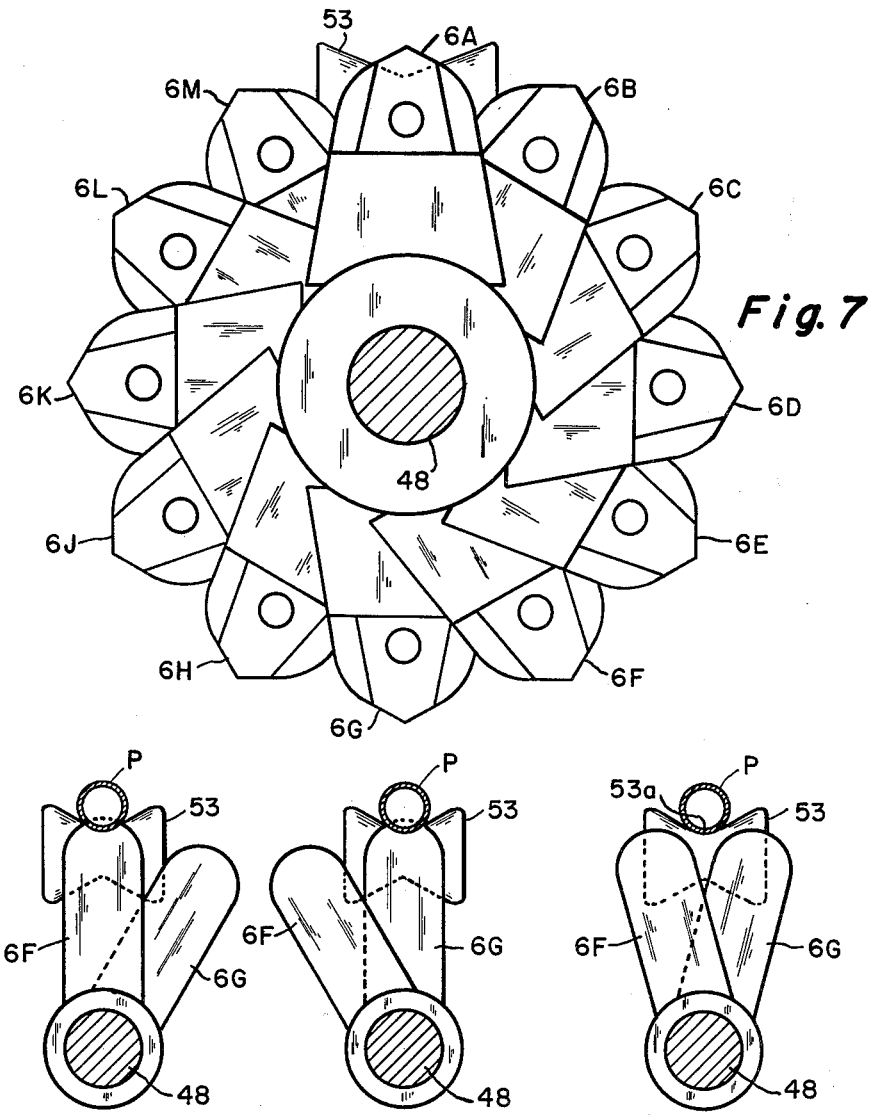

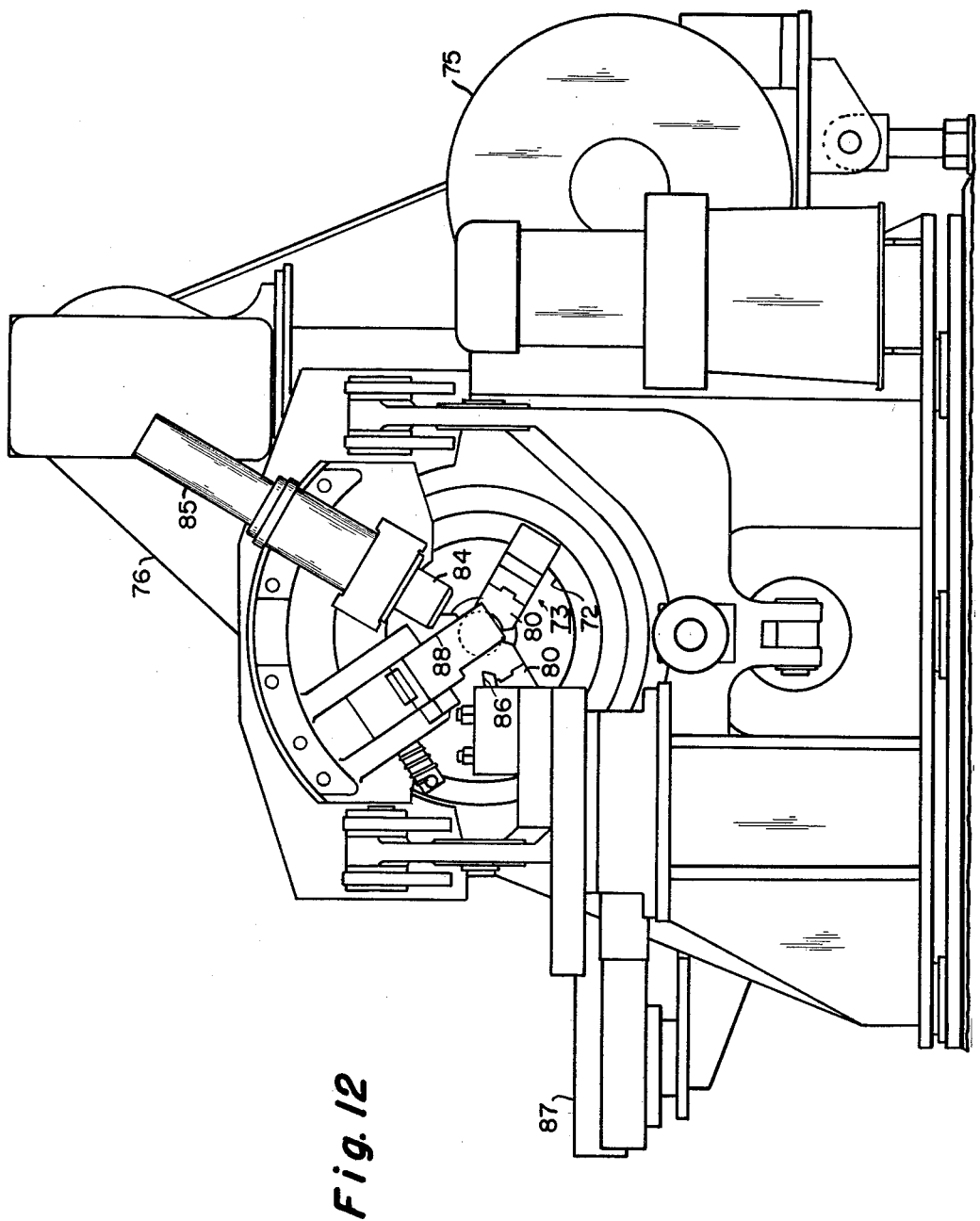

May 5, 1964

W. M. McCONNELL 3,131,588
METHOD AND APPARATUS FOR CUTTING ELONGATED
ARTICLES TO LENGTH OR INTO MULTIPLES

Filed June 12, 1962 16 Sheets-Sheet 14

INVENTOR.
William Mynard McConnell
BY Webb, Mackay & Burden
HIS ATTORNEYS

United States Patent Office 3,131,588
Patented May 5, 1964

3,131,588
METHOD AND APPARATUS FOR CUTTING ELONGATED ARTICLES TO LENGTH OR INTO MULTIPLES
William Mynard McConnell, Pittsburgh, Pa., assignor to Taylor-Wilson Manufacturing Co., Pittsburgh, Pa., a corporation of Pennsylvania
Filed June 12, 1962, Ser. No. 201,955
67 Claims. (Cl. 82—47)

This invention relates to a method and apparatus for cutting elongated articles to length or into multiples of the length thereof such as five multiples of 8 feet each from a 42 foot long article. The invention also relates to performing a work operation upon leading and trailing ends of the article or multiples thereof. It has particular utility to pipe, tube, and the like and includes end cropping and reaming, deburring and chamfering leading and trailing ends of the pipe or multiples thereof at a station or stations where cutting is carried out.

Generally, pipe as produced in a pipe mill has irregularly shaped ends and therefore requires that these ends be cropped off to produce ends which are substantially at right angles to the longitudinal axis of the pipe and to make all ends substantially uniform for easy and efficient connection of one pipe to another. Following cropping, the ends are usually chamfered externally and reamed internally.

Heretofore, cutting a pipe to length and reaming and chamfering its ends and cutting a pipe into multiples and reaming and chamfering leading and trailing ends of the multiples have required a number of time-consuming handling and conveying operations to bring the respective ends of the pipe and multiples to a station or stations where cutting, reaming and chamfering are performed. For example, cutting a pipe to length has included advancing it transversely of its longitudinal axis onto a first conveyor where it is moved endwise into a first station or machine where one end is cropped and then reamed and chamfered. Next, the pipe was backed out of the first station and then moved transversely of its longitudinal axis onto a second conveyor which advanced endwise in a direction opposite to the first mentioned endwise movement into a second station or machine where the other end was cropped and then chamfered and reamed. Thereafter, the pipe was either backed out of the second station and advanced transversely of its longitudinal axis or was moved endwise on through the second station before movement transversely of its longitudinal axis.

Cutting a pipe into multiples prior to my invention included advancing the pipe transversely of its longitudinal axis onto a first conveyor, moving it endwise into a first station where one end was cropped, reamed and chamfered, and then backing it out of the first station and advancing it transversely onto a second conveyor. Here, it was moved endwise in a direction opposite to the first mentioned endwise movement into a second station where the other end of the pipe was cropped, then reamed and chamfered. Next, the pipe was cut into multiples of its length and the leading end of each multiple was reamed and chamfered. However, the trailing end of each multiple was not reamed and chamfered and, therefore, the multiples were turned end for end and re-entered into the second station to present the trailing ends for chamfering and reaming. From the foregoing, it is clear that cutting a pipe to length and reaming and chamfering the leading and trailing ends thereof and cutting a pipe into multiples and reaming and chamfering the leading and trailing ends of each multiple included a substantial amount of handling and positioning operations which reduced production and added materially to manufacturing costs.

My invention reduces the number of handling and positioning operations and, in some instances, increases production while effecting reduction in costs and producing accurate lengths of pipe and multiples thereof. Specifically, my invention in a method of cutting an elongated article into length or into multiples and performing at least one work operation upon leading and trailing ends of the article comprises advancing the article along an endwise path of travel to bring its leading end to a first station where at least one work operation is performed. Next, the article is further advanced along the endwise path of travel so that its leading end passes through a second station spaced apart from the first station and in tandem therewith. The amount of this further advancement is equal to a first length to be cut from the article and at the first station, this first length is cut therefrom to produce it and a remainder of the article. Then the first length is advanced along the endwise path of travel to bring its trailing end to the second station where at least one work operation is performed upon the trailing end. At the first station at least one work operation is performed upon the leading end of the remainder following which the first length is advanced from the second station and the remainder from the first station along the path of travel so that the leading end of the remainder travels through the second station and its advancement is terminated at a point where the trailing ends of the remainder is at the second station. Here, the trailing end of the remainder is cropped to produce a second length and thereafter at least one work operation is performed upon the trailing end of the second length at the second station.

My invention in apparatus for cutting the elongated article to length or into multiples and performing at least one work operation upon leading and trailing ends of the article and the multiples comprises first and second stations spaced apart from each other and disposed in tandem along an endwise path of travel of the article such that the article encounters the first station and then the second station. The first station has a cut-off tool and at least one work tool operable to engage the article or a multiple thereof and the second station has at least one of a cut-off and a work tool operable to engage the article or a multiple thereof.

On the exit side of the second station is an article positioning means disposed along the path of travel for locating a given portion of the article at at least one of the first and second stations. This article positioning means comprises a run-out table, motor driven means for conveying the article therealong, a plurality of spaced apart movable stop members disposed along the table, and motor means connected to the stop members for moving selected ones into and out of an intercept position in the path of travel of the article for engagement therewith to locate it at the stations. Operatively joined to the motor means is a control means for regulating movement of the selective stop members into and out of intercept position.

The stop members are spaced apart from each other an amount substantially equal to that between the first and second stations and all of the stop members are mounted upon a support which is movable to given locations along a route substantially parallel to the path of travel of the article.

The control means includes a first initiating means for operating the cut-off tool of the first machine to cut off a first length from the pipe upon movement of its leading end to a first selected stop member substantially in intercept position to form the first length and a remainder of the pipe and for moving the first selected stop member out of intercept position and moving the next stop member towards the end of the run-out table remote from the second machine into intercept position. Additionally, the control means includes a second initiating means for actuating the motor driven means to advance the first length along the table and for operating a work tool at the first station for work upon a leading end of the remainder upon removal of the trailing end of the first length from the first machine and a third initiating means for operating a work tool at the second station to work upon a trailing end of the first length upon movement of its leading end to the next stop member and to move the next stop member out of intercept position to permit travel of the first length therebeyond. Also included in the control means may be a fourth initiating means for operating a cut-off and/or work tool at the second station upon a trailing end of the remainder upon movement of the trailing end of the remainder to the second station.

In the accompanying drawings, I have shown preferred embodiments of my invention in which:

FIGURE 7 is an end view of a stop shaft of FIGURE 1 showing positions of the stops around the shaft;

FIGURE 8 is an end view of a first selected stop in intercept position and of the next stop towards the exit end of the stop shaft of FIGURE 1;

FIGURE 9 is an end view of the stop of FIGURE 8 moved out of intercept position and the new stop moved into intercept position;

FIGURE 10 is an end view of both stops of FIGURE 8 moved into pipe passing position;

FIGURE 12 is a view along line XII—XII of FIGURE 11;

Figure 1:
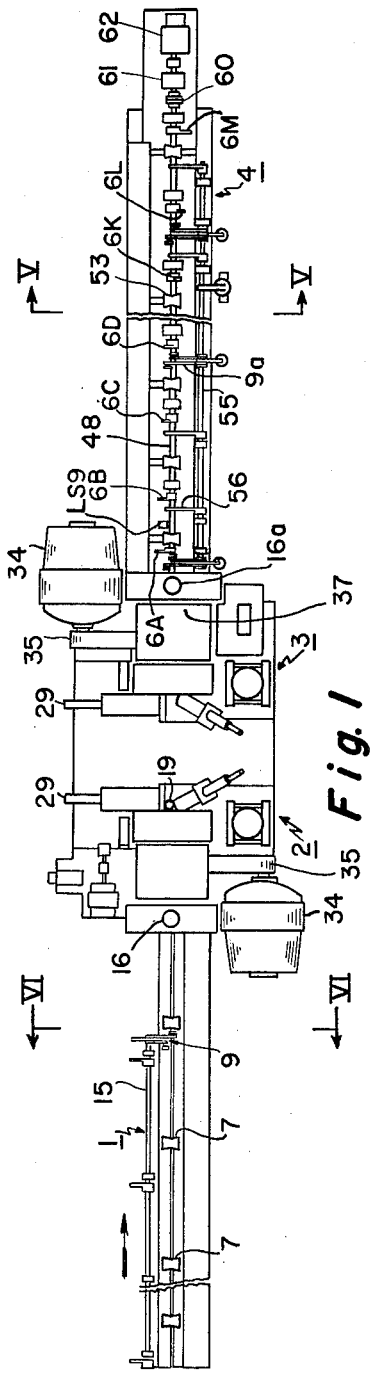
FIGURE 1 is a plan view of one embodiment of my apparatus for cutting pipe to length or into multiples.
Figure 14:
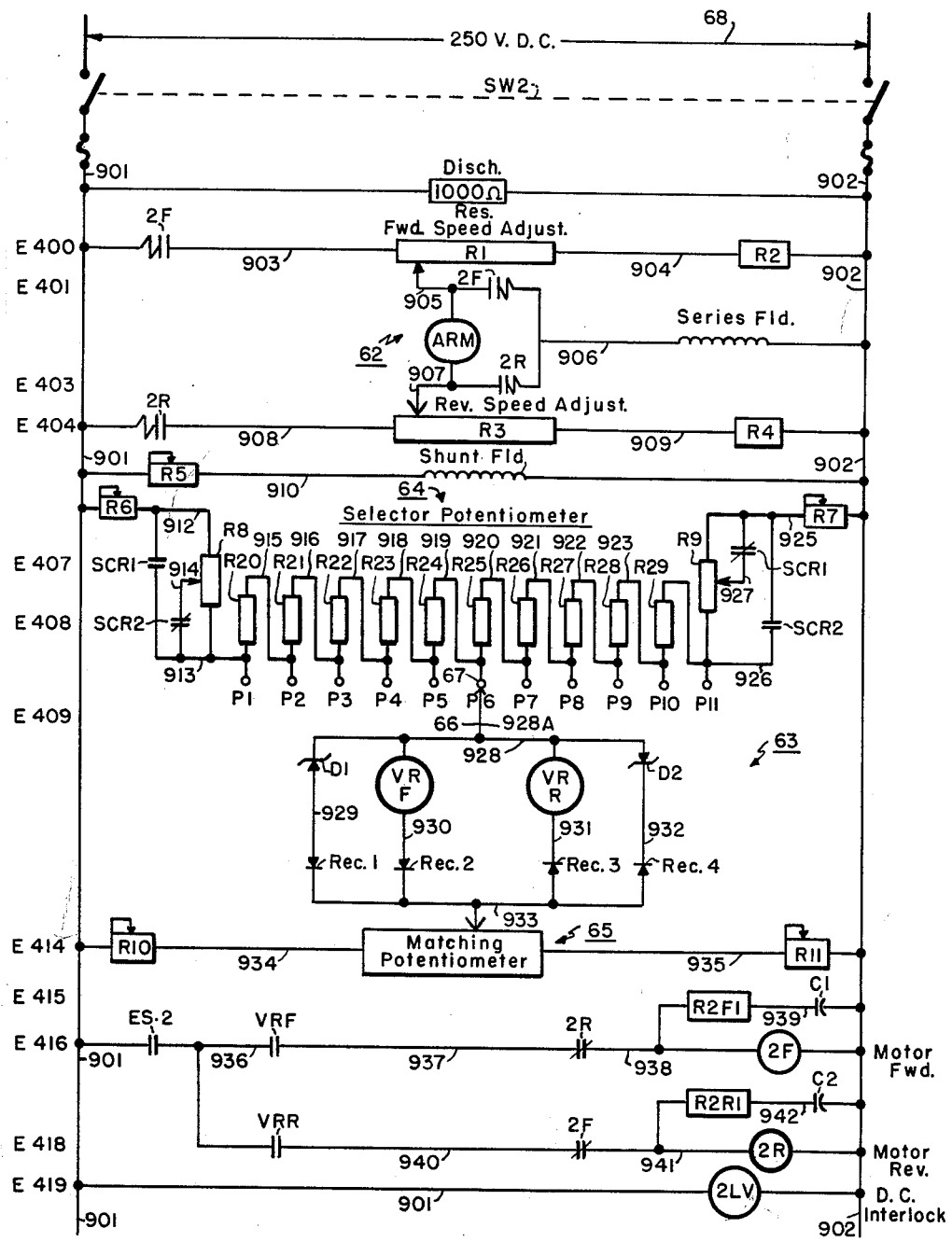

FIGURES 13A-H are schematic wiring diagrams of a control for operation of the apparatus of FIGURE 1; and FIGURE 14 is a schematic diagram of that part of the control of FIGURES 13A-H which positions selected stop members of the apparatus of FIGURE 1.

Figure 2:
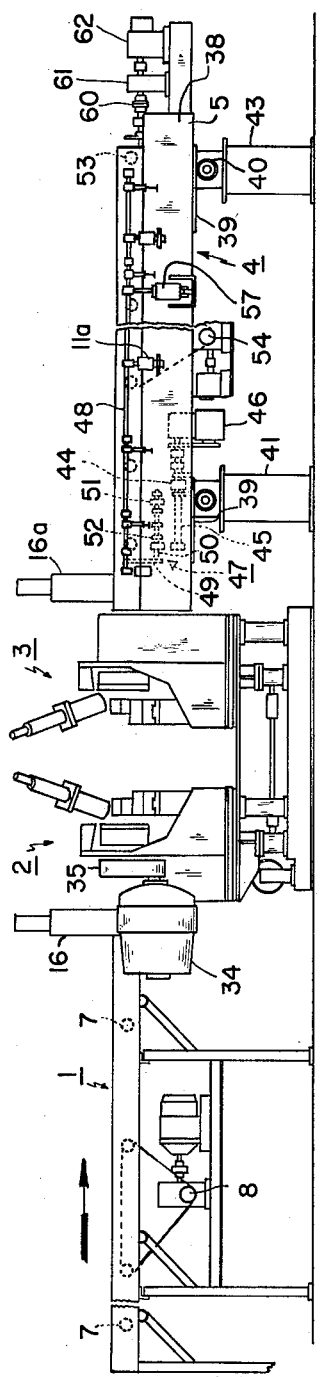
FIGURE 2 is a side elevation view of the apparatus of FIGURE 1.
Figure 3:
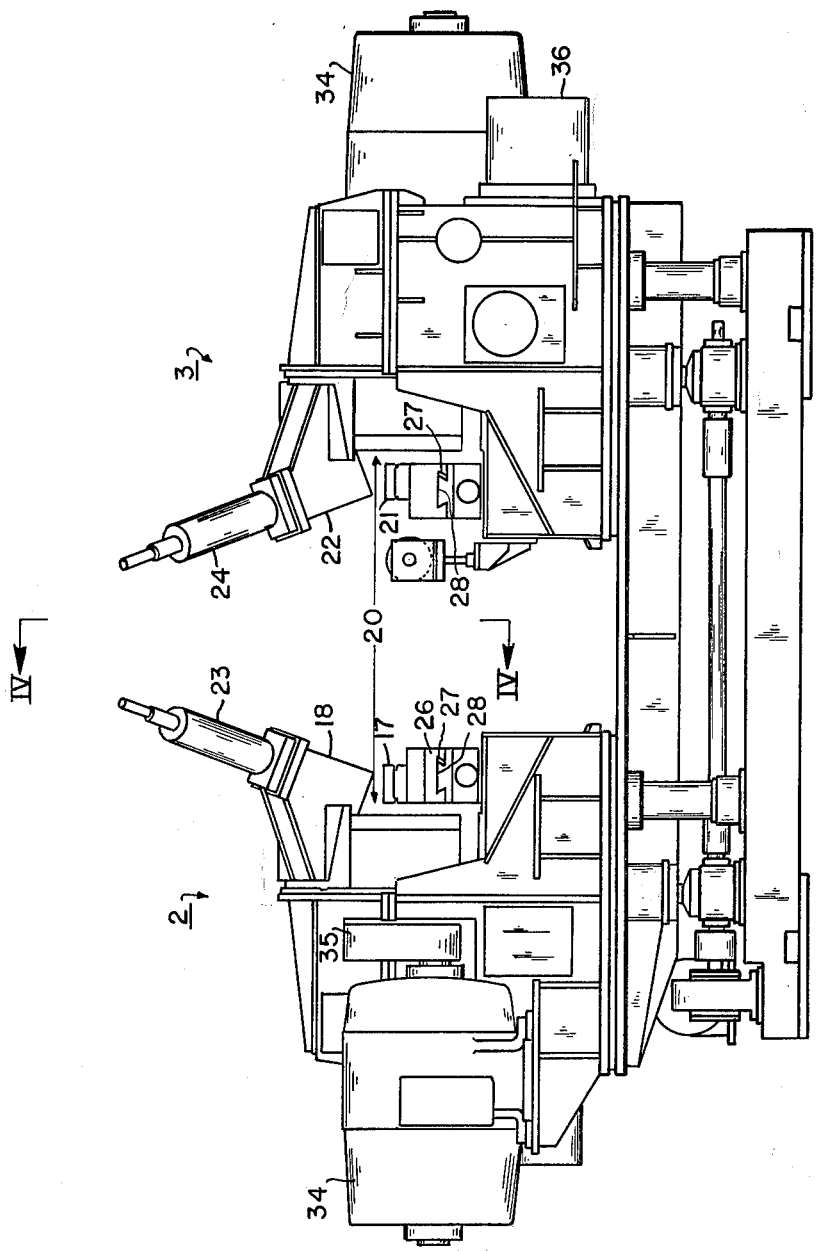
FIGURE 3 is a side elevation view of two cut-off machines of the apparatus of FIGURE 1.

Referring to FIGURES 1–3 inclusive, the apparatus there shown for cutting pipe to length or into multiples comprises a feed table 1 which receives a pipe disposed transversely thereof and which conveys the pipe along an endwise path of travel into a first station or first cut-off machine 2 and then on into a second station or second cut-off machine 3 spaced apart from the first machine along the path of travel and in tandem therewith. From the second cut-off machine, the pipe advances along the path of travel onto a pipe positioning device 4 which includes a run-out table 5 and a plurality of spaced apart stops 6 which are movable into and out of intercept position in the path of travel of the pipe for engagement with a leading end thereof. Engagement of the pipe with a selected stop locates a given portion thereof at one of the two cut-off machines.

Figure 6:
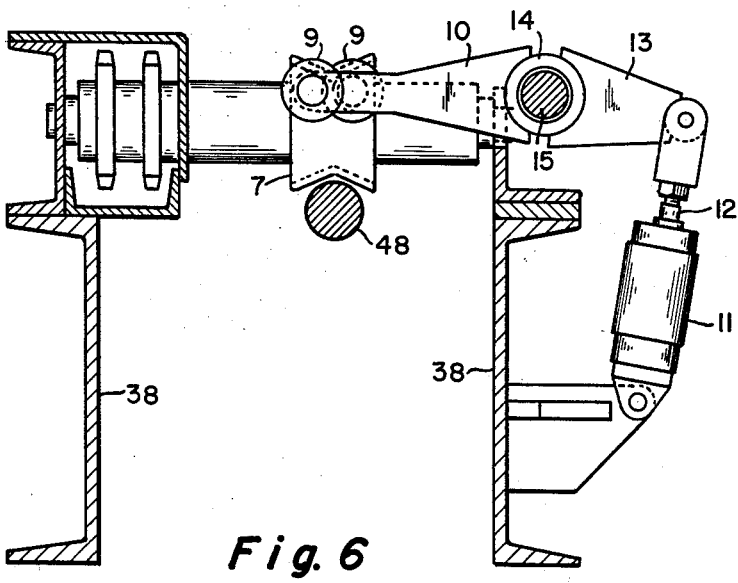
FIGURE 6 is a section view along the line VI—VI of FIGURE 1.

As shown in FIGURE 1, the feed table has a plurality of spaced apart conveyor rolls 7 driven by a motor operated link chain combination 8 for moving the pipe along its endwise path of travel. The feed table also has a plurality of spaced apart spinner rolls 9 (FIGURE 6) mounted upon an arm 10 for raising and supporting the pipe up off of the conveyor rolls 7 during cutting, reaming and chamfering operations and for lowering the pipe back onto the rolls for further travel along the apparatus. The spinner rolls 9 permit the pipe to be rotated by the machines during the cutting, chamfering and reaming operations. Raising and lowering the spinner rolls result from operation of a cylinder motor 11 whose piston rod 12 is connected to a lever 13 which, in turn, is joined to a collar 14 pivotally mounted upon a shaft 15 to which is attached the arm 10.

On the exit end of the feed table 1 is a conventional pinch roll stand 16 whose upper roll (not shown) can be lowered into engagement with the pipe traveling over a driven conveyor roll directly beneath the pinch roll to assist advancement thereof along the path of travel.

FIGURE 3 shows the two cut-off machines disposed so that the point of engagement of the tools of the first cut-off machine 2 with the pipe is spaced apart from the point of engagement of the tools of the second cut-off machine 3 with the pipe a distance which is equal to that between each of the stops of the pipe positioning device 4. The first cut-off machine has its cut-off tool 17 and its chamfer tool 18a and reaming tool 18b which form a tool combination 18 and a movable machine stop 19 (FIGURE 4) on one side of a space 20 between the two machines and the second machine has its cut-off tool 21, chamfer tool and reaming tool combination 22 on the other side of this space. The chamfering and reaming tools of the first machine are positioned for work upon a leading end of the pipe or a multiple and the reaming and chamfering tools of the second machine are disposed for work upon the trailing end of the pipe or a multiple.

The reaming tool and the chamfering tool of each combination 18 and 22 are connected together to function simultaneously and air cylinders 23 and 24 lower the combinations into engagement with the pipe which is gripped and rotated by one or both of the machines for the reaming and chamfering operations. The air cylinders also raise the reaming and chamfering tools from the pipe upon completion of their work.

Figure 4:
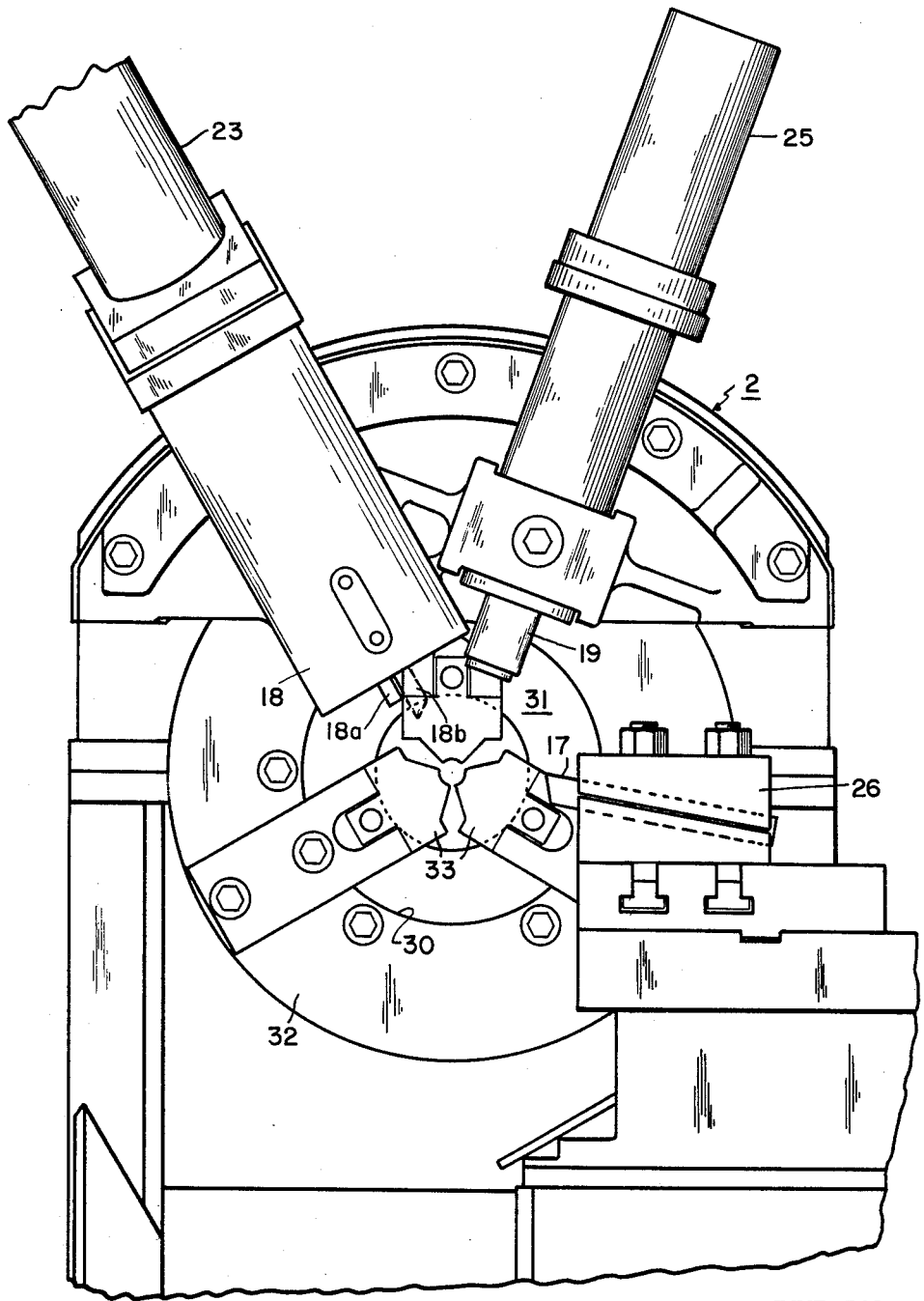
FIGURE 4 is a view along the line IV—IV of FIGURE 3.

As shown in FIGURE 4, a stop cylinder 25 lowers the machine stop 19 into an intercept position for engaging a leading end of the pipe to position it for cropping by the cut-off tool 17 and then raises the stop out of intercept position before cropping. The second machine has no machine stop for the stops of the run-out table 4 position the trailing end of the pipe or multiple at the second machine for the reaming and chamfering operations by the reaming and chamfering tools.

Each of the cut-off tools 17 and 21 is mounted upon a holder 26 which has a key-shaped bottom slot 27 for riding a key way 28 affixed to its machine. A cylinder motor 29 (FIGURE 1) advances the tool holder and the cut-off tool into engagement with the pipe and withdraws same after completion of the cut-off operation along a route transverse to the longitudinal axis of the pipe.

Each cut-off machine has a horizontally disposed rotatable barrel 30 which defines a central bore 31 extending therethrough for travel of the pipe and which mounts a chuck 32 whose jaws 33 (FIGURE 4) grip the pipe for the cut-off, reaming and chamfering operations. The barrels of the two machines are aligned with one another and each is rotated by an electric motor 34 and a belt drive 35 connected thereto so that pipe is gripped and rotated by one or both machines when cut, cropped, reamed and chamfered.

An airdraulic cylinder motor 36 connected to the jaws of the chuck of machine 3 through a shifter mechanism (not shown) closes and opens those jaws and a similar motor (not shown) opens and closes the jaws of the chuck of machine 2.

On the exit side 37 of the second cut-off machine and in alignment with the bore of its barrel is the pipe positioning device 4 which comprises the run-out table 5 made from a pair of elongated beams 38 joined together by cross members (not shown). On the entry end of the run-out table is a pinch roll stand 16a similar to the pinch roll stand 16. Extending along portions of the underside of the beams are rail members 39 which ride the top of idler rolls 40 supported by spaced apart vertical posts 41 and 43. Affixed to the post 41 closest to the machine 3 is a table drive nut 44 through which extends a table drive screw shaft 45 connected to and driven by a motor and gear reducer combination 46 which is carried by the run-out table 5. Accordingly, rotation of the screw drive shaft moves the table endwise toward and away from the exit side 37 of the second machine 3 to position the table and the stops 6 for a given length of pipe or given multiple thereof. The amount of endwise movement of the run-out table by operation of the screw drive shaft is equal to at least that distance between the two machines whereby production of given lengths of pipe and multiples which are not evenly divisible by the distance between the two machines is effected.

An indexing and measuring indicator 47 is mounted upon the run-out table and is operated from a stop shaft 48 which mounts the stops 6 through a timing belt and pulley combination 49. The indicator comprises an indexing shaft 50 which is carired by bearings 51 and which mounts a plurality of spaced apart indicating spools 52 each with indicia spaced around its periphery and corresponding to a length of pipe or multiples of the length thereof. The indexing shaft is interiorly of one of the angle beams 38 and extends parallel therewith and adjacent thereto. A measurement scale (not shown) on the outer side of the beam has openings which register with the spools and thereby permit an operator to observe the spools and determine the length cut when the stop shaft rotates to bring a first selected stop into intercept position as will be described hereinafter.

As shown in FIGURE 1, the run-out table mounts a plurality of spaced apart conveyor rolls 53 driven by a motor operated chain drive 54 substantially the same as the conveyor rolls and drive therefor of the feed tables. Also, the table mounts a plurality of spaced apart pairs of spinner rolls 9a, each of which is raised and lowered by a motor cylinder 11a. Since these spinner rolls are the same as the spinner rolls of the feed table, further description thereof is unnecessary.

Figure 5:
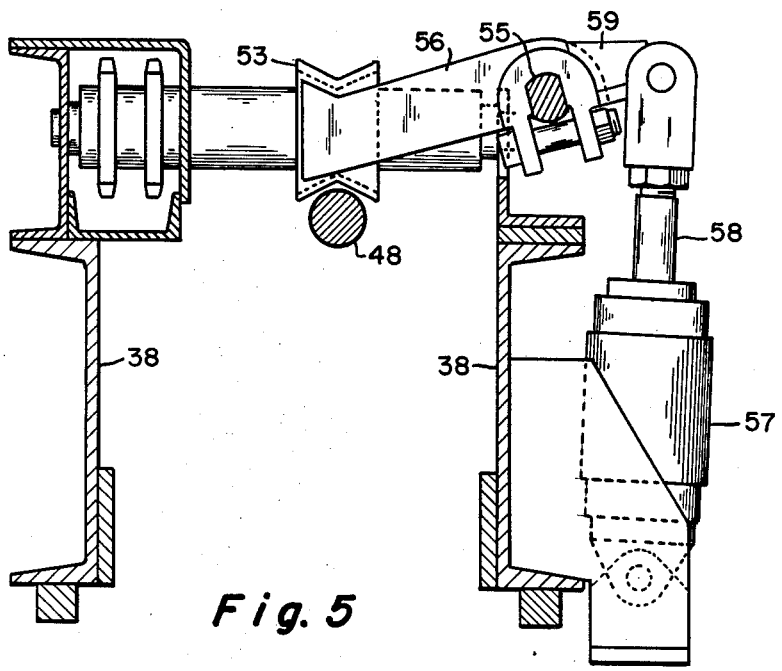
FIGURE 5 is a section view along the line V—V of FIGURE 1.

Extending longitudinally along the run-out table parallel to its longitudinal axis is a rotatable kick-out shaft 55 which supports a plurality of spaced apart kick-out arms 56 operable from a lowered position below the top surface of the conveyor rolls 53 (FIGURE 5) to a raised position above the conveyor rolls. A cylinder motor 57 whose piston rod 58 is connected to a lever 59 affixed to the shaft 55 rotates the shaft to effect raising of the kick-out arm to remove a pipe or multiple from the conveyor rolls.

The horizontally disposed stop shaft 48 extends substantially the length of the run-out or delivery table below the conveoyr rolls 53 (FIGURE 5) from the entry end of the table adjacent the exit side of the second machine to the far or exit end of the table. This shaft mounts 12 spaced apart stops 6A, 6B, 6C, 6D, 6E, 6F, 6G, 6H, 6J, 6K, 6L, 6M (FIGURE 7) welded thereto and accurately positioned therealong so that the distance between one stop and the next one towards the far end of the shaft is the same as the distance between the two machines. As shown in FIGURE 7, the stops are located 30° apart around the circumference of the shaft 48.

Connected to the stop shaft at its far end through a coupling 60 and a gear reducer 61 is a direct current motor 62 which rotates the stop shaft given amounts about its longitudinal axis to bring a selected stop into an intercept position in the path of travel of the pipe. In intercept position, the leading end of the pipe engages the selected stop to position a given portion of the pipe or a multiple at either the first machine 2 or second machine 3 or to position a trailing end of the pipe or a multiple at the second machine 3.

Operation of the direct current motor to bring a selected stop member into and then out of intercept position is regulated by a control 63) (FIGURE 14) connected to the motor 62. This control comprises a selector potentiometer 64 on an operator's control panel (not shown) and a matching potentiometer 65 on the run-out table and connected to the selector potentiometer 64. Movement of a selector switch 66 to a numbered position 67 on the selector potentiometer selects the stop to use for a specified length of pipe or multiple. Engagement of the leading end of the pipe or the multiple with the selected stop positions the pipe for a cut-off and/or reaming and chamfering operation at the first machine 2 and includes use of the next stop towards the far end of the table for engagement of the leading end of the pipe or the multiple with this next stop to locate the pipe for a cut-off and or reaming and chamfering operation at the second machine 3.

Positioning of the stops is automatic and, as shown in FIGURES 8–10, comprises advancing the selected stop 6F into intercept position (FIGURE 8) where it engages and positions the pipe P for the first machine 2. Next, the selected stop is rotated 30° counterclockwise out of its intercept position to bring the next stop 6G toward the far end of the run-out table into intercept position where engagement thereof with the leading end of the pipe positions its trailing end at the second machine 3. Thereafter, the stop shaft rotates 15° clockwise to locate the two stops 6F and 6G in pipe pass position where they straddle the path of travel of the pipe and notch portion 53a of the conveyor roll 53 so that the pipe may be advanced beyond the next stop 6G for kick-out transversely of its longitudinal axis from the run-out table 5.

As shown in FIGURES 8–10, the top of each stop extends upwardly above the lower portion of the notch 53a of the conveyor rolls where it is engaged by the leading end of the pipe.

Referring to FIGURE 14, positioning of the stops 6 is achieved by circuits E400–E418 which are energized from a D.C. power source 68 and which include a dual potentiometer system wherein the operator sets the position desired as a voltage on the selector potentiometer 64 through circuits 901, 912–925, 902, and the motor drive shifts a matching potentiometer wire 933 until the voltage on the matching potentiometer 65 matches that on wire 923. When this occurs, resistance in the selector potentiometer 64 is the same as that on the matching potentiometer 65 and relays VRF and VRR drop out and stop the D.C. motor 62.

These relays VRF and VRR are sensitive and act as voltage and direction of stop shaft rotation detectors with the direction of the stop shaft rotation determined by rectifiers REC2 and REC3 to bring the selected stop into its intercept position. These relays pick up and drop out at settings as low as 2 volts through spacing adjustment and spring adjustment thereon. They are set to pick up with less than 15° of rotation of the stop shaft and drop out near 0° of rotation but at an amount of rotation enough to allow for travel of the D.C. motor during braking thereof. A braking circuit for the D.C. motor comprises wire 905 through relay 2F to wire 906 to relay 2R to wire 907.

I use resistors R6 and R7 to set the reference voltage on the selector potentiometer 64 to match rotation of the stop shaft as represented by the voltage in the matching potentiometer. If the rotation from position P1 to position P11 is greater than 300°, then more resistance is added in R6 and R7. If the rotation is correct but the stops are off center relative to intercept position, adding resistance to R6 and subtracting the same amount from R7 shifts the stop in intercept position toward the next stop toward the far end. Likewise, subtracting resistance from R6 and adding the same amount to R7 shifts the stop in intercept position towards the next stop towards the entry end of the table.

The resistors R20–R29 inclusive of the selector potentiometer 64 each have the same ohmage and represent 30° of rotation of the stop shaft. Resistors R8 and R9 have the same ohmage as resistors R20 to R29 and function to determine whether the stop shaft rotates 30° or 15°. When a stop such as 6F has been selected and a relay SCR1 representing stop position 1 to locate the pipe for the first machine 2 operates, resistance R8 is shorted out and the short on R9 is removed so that all of R9 is in circuit, thus setting the selector circuit for the machine 2 and causing stop 6F to move into its intercept position. When relay SCR2 representing stop position 2 to locate pipe for the second machine 3 is energized and SCR1 de-energized, R8 is in circuit and R9 is shorted out, whereby the selector circuit is shifted for the next stop towards the far end of the run-out table 5 to move it into intercept position for locating the pipe at the second machine 3.

When both relays SCR1 and SCR2 are de-energized, one-half of both resistances R8 and R9 are in circuit with a total resistance equal to that of either but with the resistance divided between the first and second machines. This condition effects rotation of the stop shaft through 15° to bring the two stops into pipe pass position, as shown in FIGURE 10, and occurs irrespective of which of the 11 positions P1–P11 have been selected. Rectifiers REC1 and REC4 in series with zener diodes D1 and D2 limit the maximum voltage across relays VRF and VRR to protect same.

Automatic operation of the feed table, its spinner rolls, the run-out table, its spinner rolls, the chucks, the machine stop on No. 1 machine, the cut-off tools, chamfering and reaming tools, the stop shaft and the kick-out are under control of a plurality of limit and pressure switches and solenoid operated valves. Referring to FIGURES 13A–H, limit switch LS1 (FIGURE 13A) is on the feed table 1 and is closed by delivery of a pipe thereto. Closing of this switch starts the feed table conveyor rolls 7 forward to advance the pipe towards the first machine 2. The pipe travels forward and closes proximity limit switch LS2 (FIGURE 13C) at the entry side of the first machine 2 to indicate that a pipe is in the first machine. Closing of this limit switch energizes a solenoid valve 1J and lowers the entry pinch roll to insure that the leading end of the pipe travels against the machine stop 19. Closing of this limit switch LS2 also slows down the feed table and initiates a timed cycle to the table 1. After a set time, the feed table conveyor rolls are stopped, the solenoid valve 1J is de-energized to raise the pinch roll, a solenoid valve 1K is energized to raise the spinner rolls 9 of the feed table, a solenoid valve F is de-energized to raise the machine stop 19 and a solenoid valve 1G is energized to close the chuck of the first machine 2.

Raising of the machine stop 19 trips limit switch LS3 (FIGURE 13D) and starts a cutting cycle by closing relay 1CYCR to advance the cut-off tool 17 of the machine 2.

Advancement of the cut-off tool is at a rapid rate until it trips limit switch 1LS4 (FIGURE 13H) which energizes a solenoid valve 1B for feed advance and the tool continues forward travel until it trips limit switch 1LS5 (FIGURE 13D) to return the tool 17 to its back position.

Arrival of the cut-off tool at back position trips a limit switch 1LS6 (FIGURE 13D) which energizes a solenoid valve 1E to start reaming and chamfering operations by lowering the reaming and chamfering tool combination 18 into engagement with the leading end of the pipe.

The reaming and chamfering tools travel downward and close a limit switch 1LS7 (FIGURE 13D) and after a timed delay, the solenoid valve 1E is de-energized and returns the reaming and chamfering tool combination 18 to starting position.

Arrival of the reaming and chamfering tool combination 18 to starting position closes a limit switch 1LS8 to effect release of the chuck of the first machine to lower the parallel rolls 9, to drop the pinch roll 16 and to start the feed and run-out table conveyor rolls forward. Then, the pipe travels forward to the selected stop on the stop shaft and after tripping a limit switch LS9 on the entry end of the run-out table, the pinch roll 16 is raised and the parallel rolls on both tables are raised. Additionally, the next stop on the stop shaft is rotated into intercept position while the selected stop is rotated out of intercept position, the chuck on the first machine is closed and a cutting operation on the first machine is started.

Return of the cut-off tool 17 on the first machine trips the limit switch 1LS5 which lowers the pinch roll 16a on the run-out table and starts the run-out table rolls forward to advance the cut-off length or multiple to the next stop and remove it from the first machine. Afterwards, the leading end of the remainder of the pipe is reamed and chamfered on the first machine and a timer is actuated on the run-out table to stop its conveyor rolls, to raise the pinch roll 16a, to close the chuck on the second machine, and to rotate the two stops to pipe pass position.

Closing of the chuck on the second machine starts a timer for reaming and chamfering the trailing end of the multiple on the second machine which is effected similarly to the reaming and chamfering on the first machine.

Return of the reaming and chamfering tools on both machines opens both chucks, drops both sets of parallel rolls, both pinch rolls, and starts the run-out table forward. The multiple then releases LS9 which, in turn, energizes a solenoid valve L to operate the kick-out 56 and to rotate the selected stop on the run-out table into intercept position. The kick-out is returned by a timer which de-energizes the solenoid valve L for the kick-out and starts the feed table rolls forward.

A limit switch LS10 between the two machines indicates presence of pipe therebetween. When the remainder or last multiple has cleared LS2 and LS10, then the trailing end of the pipe is cropped on the second machine and the trailing end thereof is reamed and chamfered thereon. Additionally, when the trailing end of the remainder clears LS2, another pipe is delivered onto the feed table.

A control for automatic operation of the apparatus will now be described.

*Feed Table Control*

The control for the feed and run-out tables includes interlocks and for the feed table, an interlock relay TR1X, circuit E161.

Automatic operation of the feed tables is obtained through an entry table initial cut relay ETR, circuits E1 and E47, and tables tandem run relay TTR1, circuits E2 and E165, and through machine stop relay 1SR1, circuits E2 and E108. Relay 1TFX, circuit E35, is a repeater for additional interlocks on relay 1TF, circuit E1.

In automatic operation for cropping the leading end of pipe, relay LS10X1 checks that no pipe is in the first machine and operates the stop 19 for cut-off through relays 1SR1, circuits E2 and E108. The machine stop 19 stays down until timed out by a stall relay 1ST, circuit E49. A timed delay release relay 1SR2T, circuit E111, for the machine stop 19 delays return thereof momentarily to allow time for the spinner rolls of the feed table and the chuck of the first machine to operate.

The relay ETR starts the feed table conveyor rolls and operates by closing of LS1, operation of relay LS10X1, relay Auto–1 and relay 1SR2. Operation of LS2 through its relay LS2XX1 operates relay LS2X, circuits E88 and E89, which, in turn, start a stall timer 1ST. This timer is set just long enough for the pipe to engage the machine stop 19, after which relay LS2XX1 drops out and the feed table continues forward at a slow speed until ETR, circuit E1, opens. The stall time relay 1ST operates a relay 1STR, No. 1 stall AUX. which opens ETR, circuit E47, to stop the feed table and set up the first machine for operation.

The feed table operates with the run-out table to handle pipe through both machines after the cropping of the leading end of the pipe. This is achieved through TTR1, circuit E2, with an interlock of 1SR1 which prevents tandem operation when cropping the leading end of the pipe.

Run-Out Table Control

In automatic operation of the run-out table, tandem operation is obtained for advancing and handling the pipe through both machines by relays THS2, THS1, TTR3, circuits E67 and E68, and relay TTR1, circuit E12.

To produce multiples by cutting off in the first machine and advancing the multiple to the second machine for chamfering and reaming, the control provides a sequence of operation wherein the pipe advances 3 feet from the selected stop which positions it for No. 1 machine to the next stop toward the far end of the run-out table for positioning its trailing end for the second machine. This is obtained through relays DTRS and DTR, circuits E77 and E78, and relays DTRST and DTRT which time the operations. Relay DTRT times the slow-down of the tables through a slow RES. contactor 2S2, circuit E72, and DTRST is a stall timer to insure that the leading end of the multiple is against the next stop.

This same operation takes place on the last cut of a multiple when LSX21 opens relay LS11X, circuit E96. Then, relay LCR, circuits E261 and E262, energizes and transfers stop operation of the run-out table to the second machine, stops the tandem run and starts the run-out table conveyor rolls through 2SR3, circuit E80. After stall time relay DTRST times out, the stall auxiliary relays 3STR1 and 2 permit the second machine to cut off the trailing end of the remainder and to ream and chamfer it.

After the second machine operations, the run-out tables advance the pipe or multiple for kick-out through interlocks, circuits E80 or E81, which are controlled by relays 2CYRT indicating that the chamfer and reaming tools are back, or relay 2MSR1 which is a master sequence relay.

Feed and Run-Out Tables Tandem Operation

After the first cut-off operation, both tables run to position the pipe through operation of relays and times TTRT, TTR1, TTR2, TTR3, 2ST, 2STR1, and 2STR2, circuits E163–E167, E198–E200. The tandem run relays TTRT, TTR1 and TTR2 operate when the selected stop is in intercept position.

Relay 2ST, circuit E198, sets the stall time to insure the leading end of the pipe or multiple is against the selected stop member 6F for the cut-off cycle to begin. Relays 2STR1 and 2 function after the stall time is complete and permit the second machine to operate for its cut-off, reaming and chamfering operations.

Feed and Run-Out Pinch Roll Control

The feed table pinch roll 16 is actuated by LS2X1, circuit E115, when the pipe is in the pinch roll stand except when the spinner rolls of the feed table are raised. The run-out table pinch roll 16a is lowered onto the pipe by relay LSX92, circuit E207, except when run-out table spinner rolls 9a are raised provided that the run-out table is operating through relay 2TFX2, circuit E209, or the tables are running in tandem.

Pipe Feed Device Control

When there is no pipe in the first machine as indicated by LS10X1 and no pipe on the feed table, a conventional pipe feed device operates through relay 1KR, circuit E101, to place a pipe on the feed table. A relay 1KRT times the operation.

Kick-Out Control

When no pipe is on the run-out table, kick-out relays 2KR1, 2 and 3, circuit E287, and relay LS9X2 operate to make sure that the feed table is clear when the apparatus starts up and each time a pipe clears LS9. These relays also clear the first and second machine cycle relays to start the next operation through 2KR1 operating a kick-out timer 2KRT, circuit E290, and through 2KRT, the kick-out relay 2KRX, circuit E291.

Relay LS9XT, circuit E292, is set for a short timed delay longer than the delay provided by 2RPT to allow one initiating cycle of the kick-out and to allow the initiating relays to reset in automatic as soon as 2KRX opens.

Run-Out Table Stop Control

As described, the run-out table stops have three positions, namely, position 1 which locates a pipe or multiple for the first machine; position 2 which locates the trailing end of a pipe or multiple for the second machine; and position 3 which shifts the selected stop and its next one toward the far end to a pipe pass position. The three positions of the run-out table stops are controlled by three relays 2 stop 1, circuit E272, which indicates that the selected stop is in intercept position; relay 2 stop 2, circuit E275, which shows that the next stop towards the far end is in intercept position and relay 2 stop 3 which effects operation of the selected stop and its next one into pipe pass position. These three relays are momentarily energized and then transfer their operation to relays SCR1, 2 and 3 which seal in until operation is complete. The contacts of relays SCR1 and 2, circuits E407 and E408, shift the D.C. balance of the selector and matching potentiometer circuit operating relays VRF and VRR. These relays polarized with rectifiers REC2 and REC3, pick up corresponding contactors SFX and SRX to run the D.C. motor to balance the potentiometer circuit E414 to drop out the voltage relays.

First Machine Control

Operation of stall relay 1STR1 raises the spinner rolls of the feed tables for cropping the leading end of the pipe. On subsequent cutting operations, the spinner rolls raise on operation of stall 2 relay 2STR1 and with pipe in the machines as indicated by LS11X3, circuit E128, and the spinner rolls are held up until the cut-off is completed through circuit E133.

The parallel roll time relay 1PRRT checks that no pipe is in the machines through circuit E130 or if pipe is in both machines as shown by circuit E129 and makes certain that both spinner rolls 9 and 9a are up if there is pipe in both machines. Next, the chucks close through circuit E138 and a chuck closed timer 1CRT energizes circuit E139.

Advancement of the cut-off tool 17 now starts through relay Auto–3, circuit E145, and operates limit switch 1LS4 to reduce the speed of travel of the tool which then operates limit switch 1LS5 at the end of the cutting-off operation and returns the tool 17 to starting position.

If selected, the chamfer and ream tools now operate and engage the limit switch 1LS7 and then return after completing the chamfering and reaming operations. Return of the chamfer and reaming tools energizes master sequence relay 1MSR1, circuit E157.

A crop cut cycle relay CCY, circuit E118, distinguishes between the crop cut of the leading end of the pipe and subsequent cuts. This relay sets up the proper reset circuit for the master relays, namely, MSR2 for the initial cut and MSR1 for subsequent cuts. When the cut-off operation only is desired, then circuit E159 is used.

Second Machine Control

The spinner rolls 9a of the run-out tables raise through operation of circuit E218 for a cutting operaton on the first machine as checked by the tandem stall relay 2STR1. For crop cut on the remainder or trailing end of a pipe and for chamfer and reaming of multiples, circuit E220 raises the spinner rolls of the run-out table.

After the spinner rolls have been raised, advancement of the cut-off tool 21 of the second machine starts through relay Auto–4, circuit E234, and operation of relay LCR. The cut-off operation terminates with relays 2LS5X1 and 2 and 2LS6X1 energized. Then circuit E251 through relay Auto–5 operates the chamfer and reaming tools for work upon the trailing end and in the event that the pipe has been previously cut on the first machine, the chamfer and reaming operations start at once and the advancement of the cut-off tool 21 is omitted.

Upon completion of the chamfer and reaming operations, the master relays are energized and reset when the kick-out operates through relay 2KR1, circuit E255.

Limit switch relays LS11X1, 2, 3 and 4 indicate that a pipe is being cut in both machines. This relay circuit energizes when the pipe travels through the second machine after cropping its leading end. These relays deenergize when the trailing end of the pipe clears LS2 and drops out LS2X1 and 2. Limit switches LS2 and 9 together with LS10 must operate to insure that the second machine operates.

When the selector switch is set for multiple cut and LS11X relays indicate that the pipe end is in the second machine, relays LCR and LCR2, circuits E261 and E262, operate and transfer the run-out table selected stop from the first to the second machine and set up the second machine for cropping.

Figure 11:
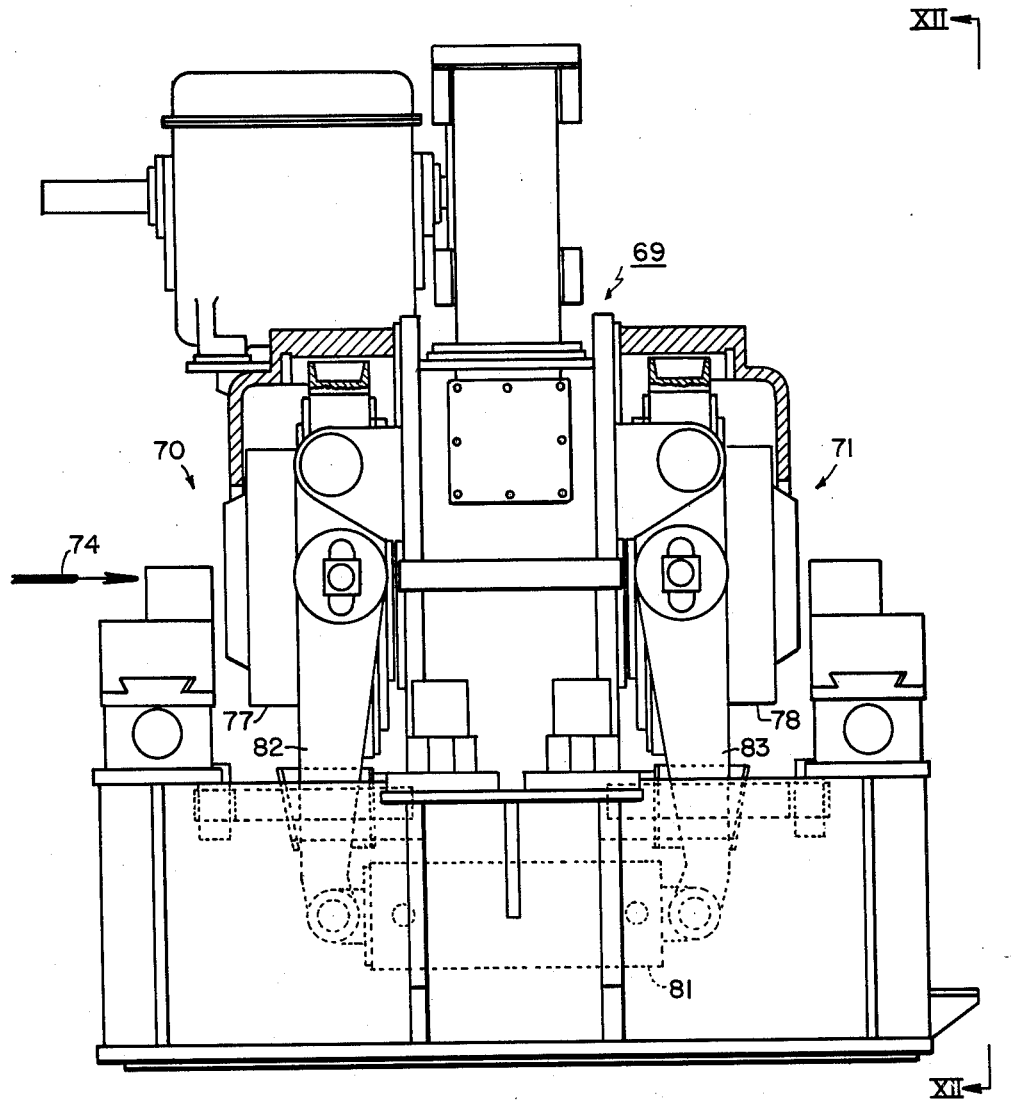
FIGURE 11 is a side elevation view of a modified cut-off machine for use in the apparatus of FIGURE 1.
Figure 13A:
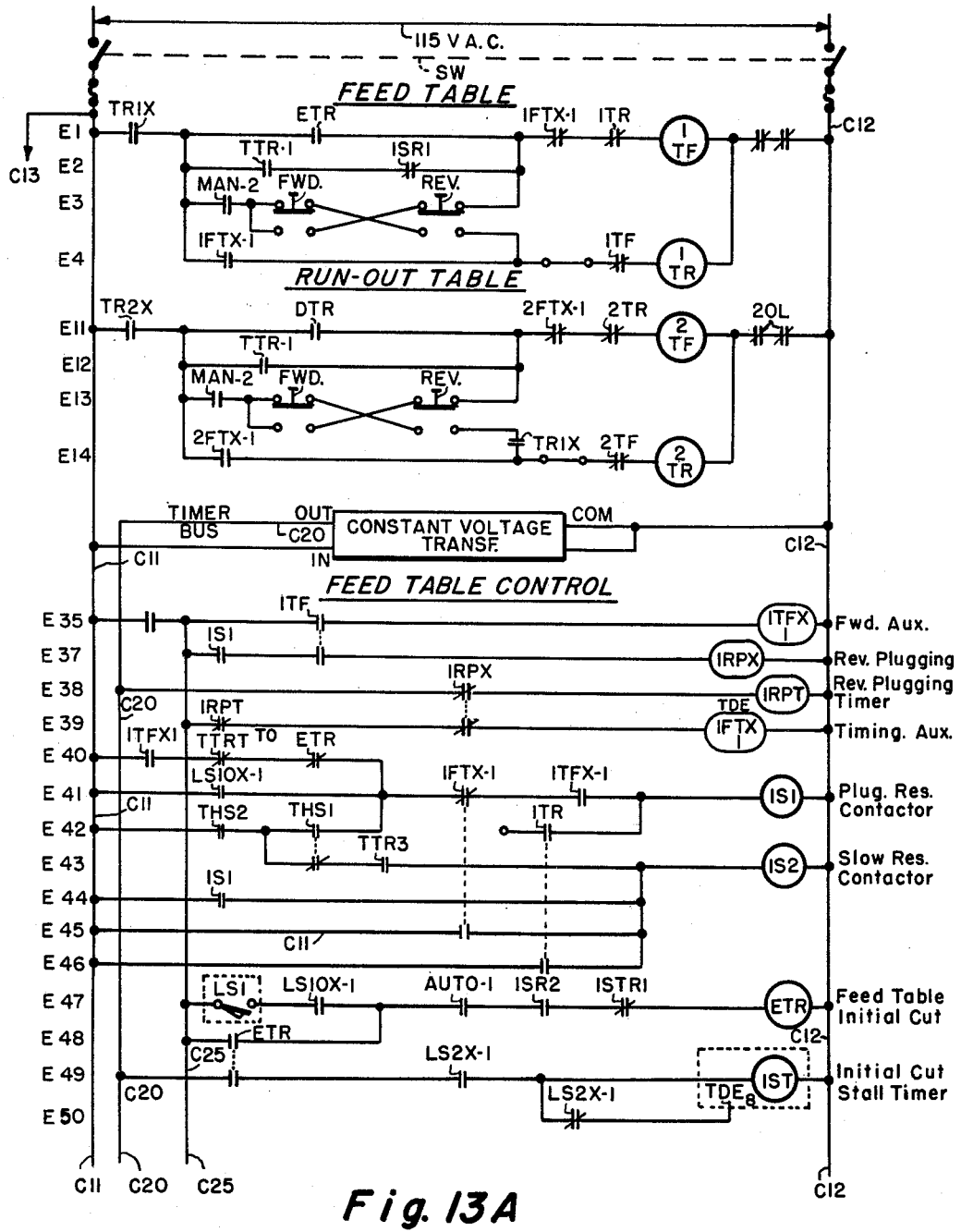
Figure 13B:
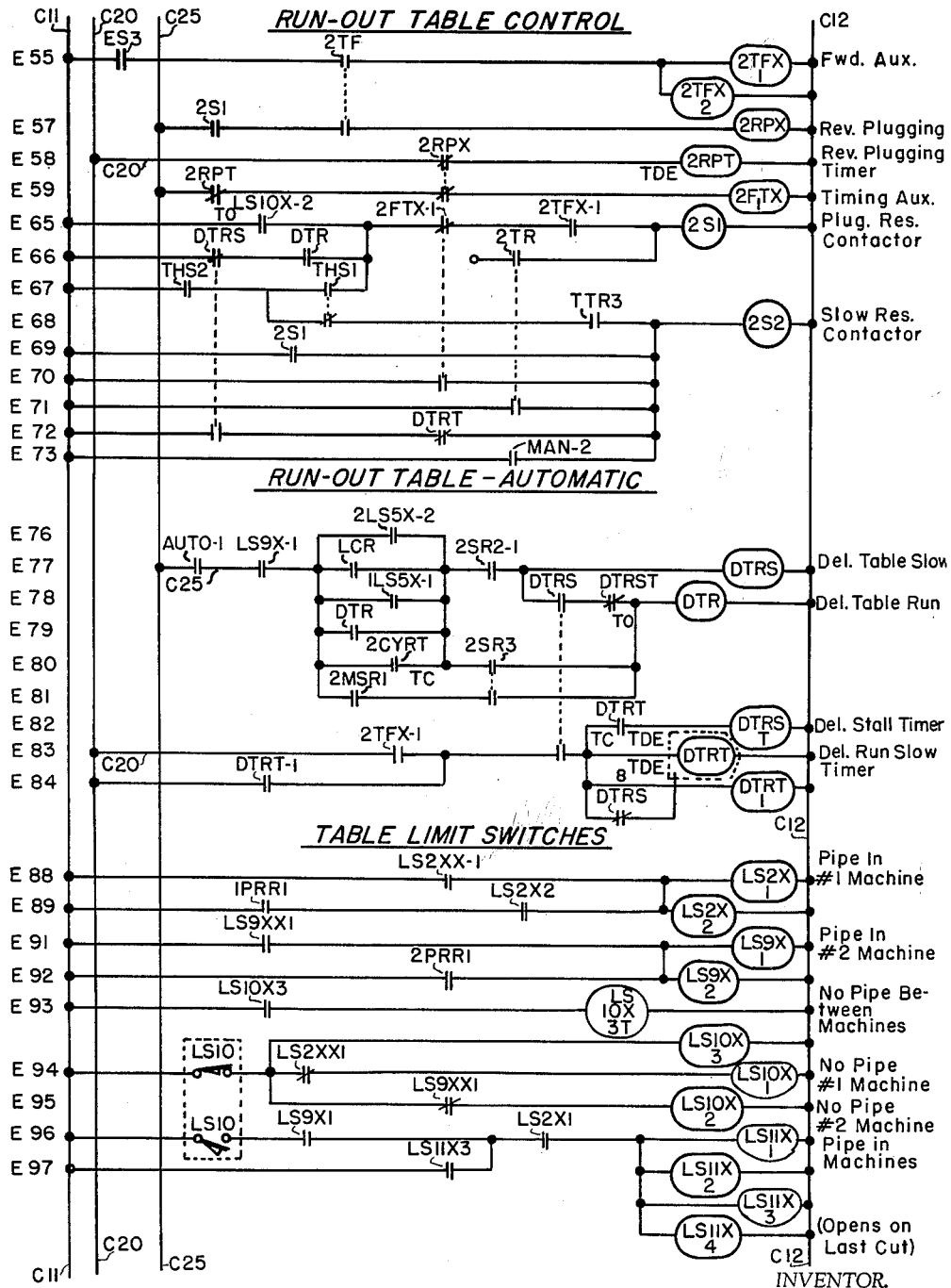
Figure 13C:
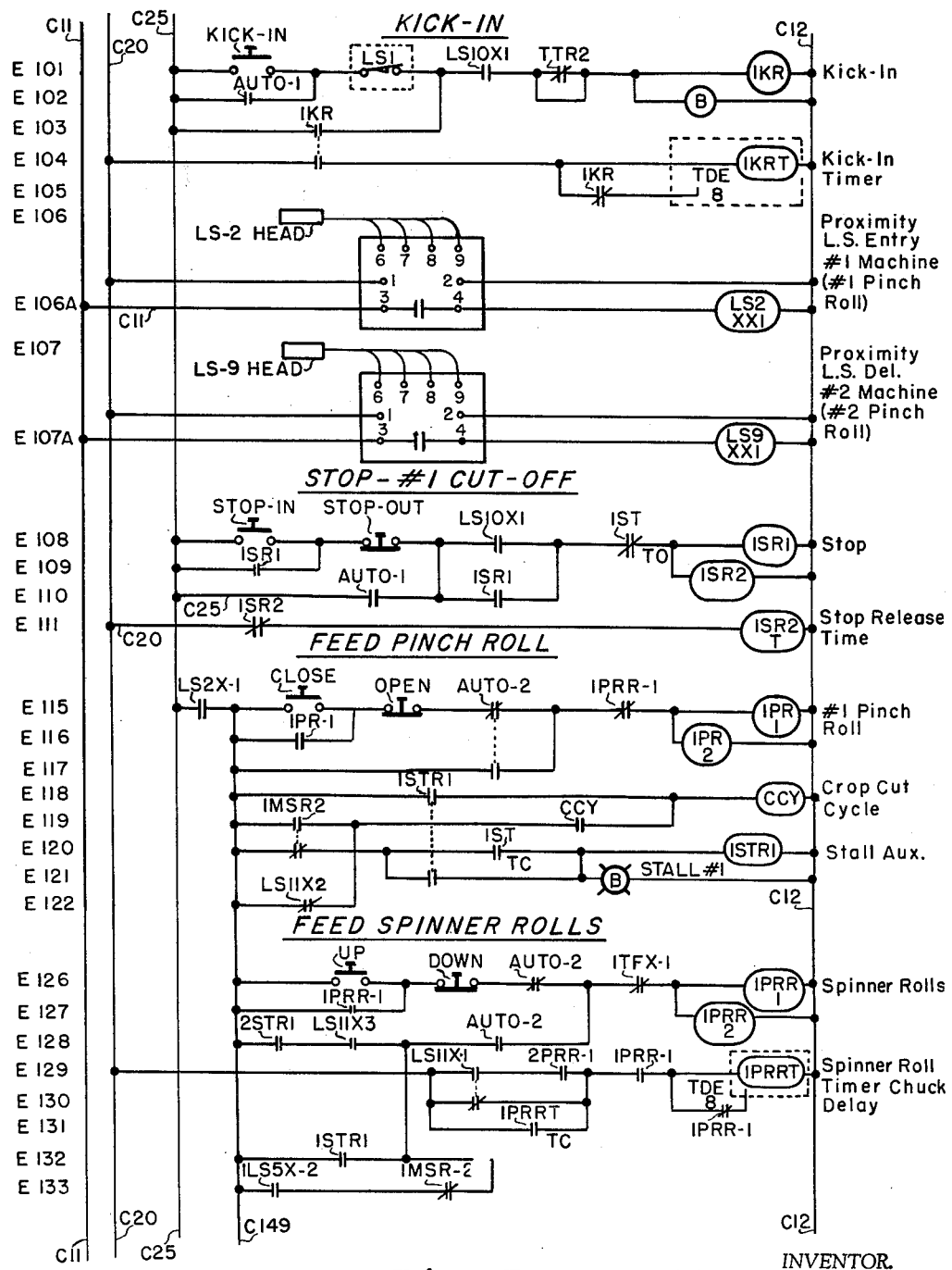
Figure 13D:
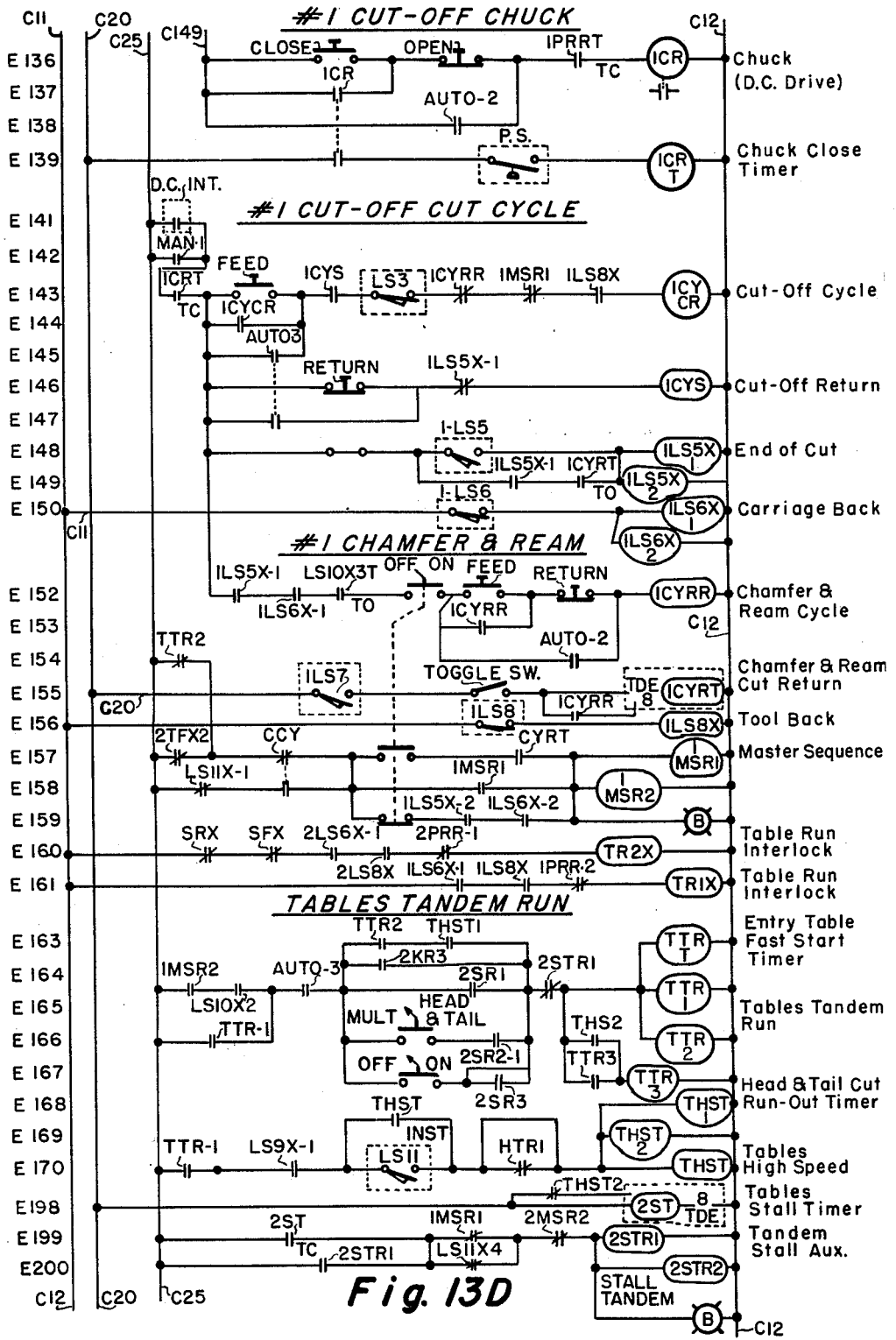
Figure 13E:
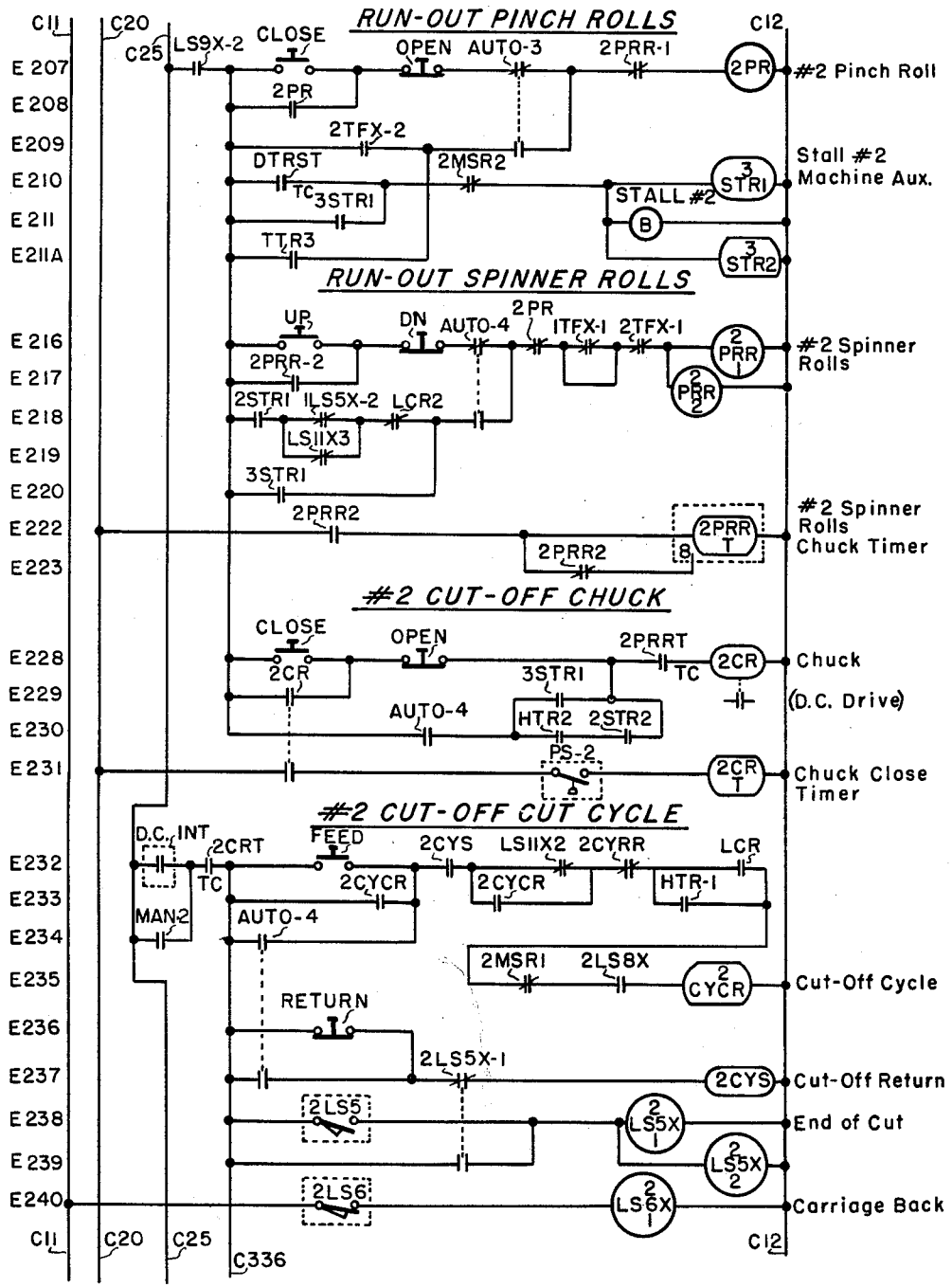
Figure 13F:
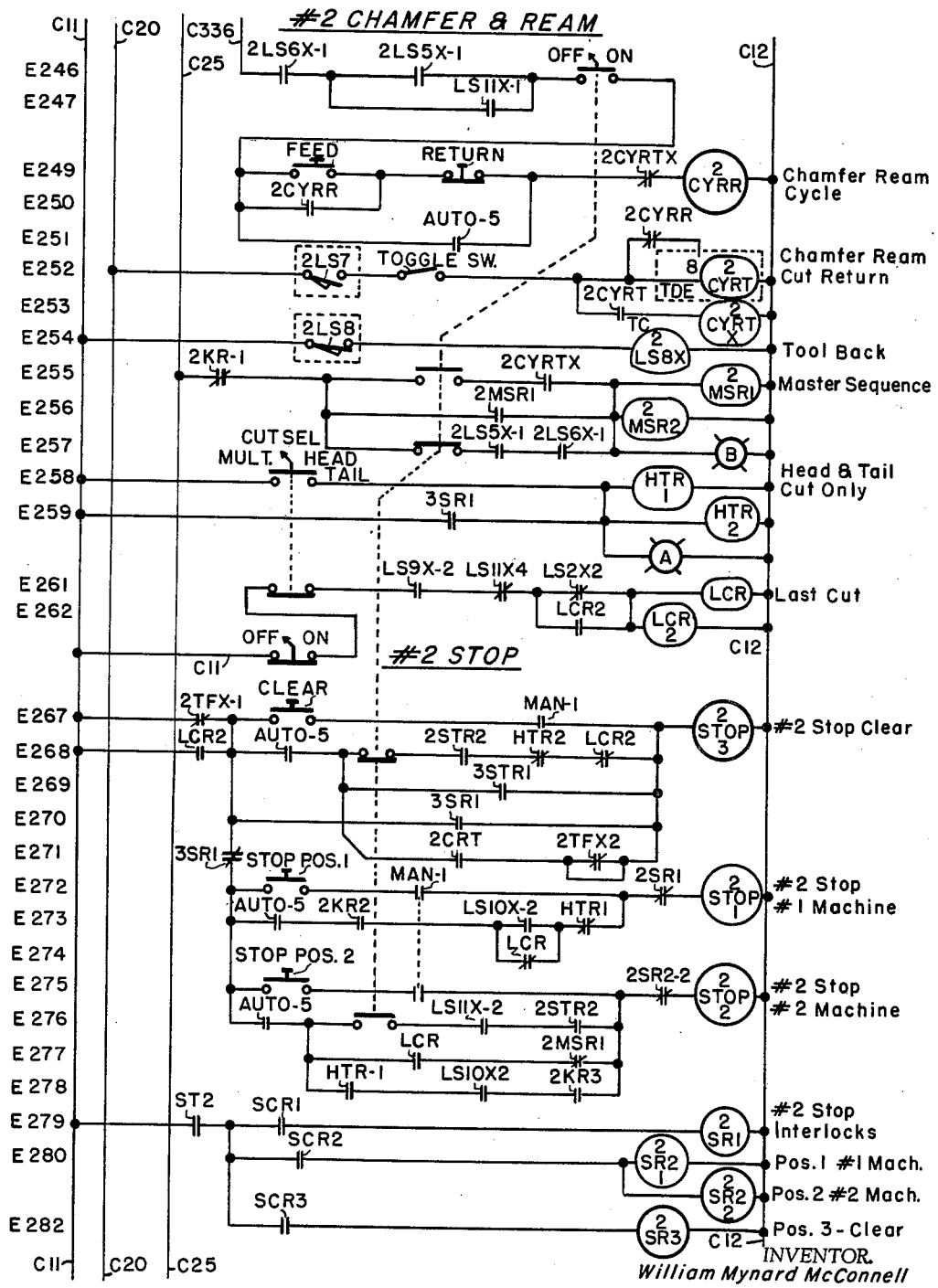
Figure 13G:
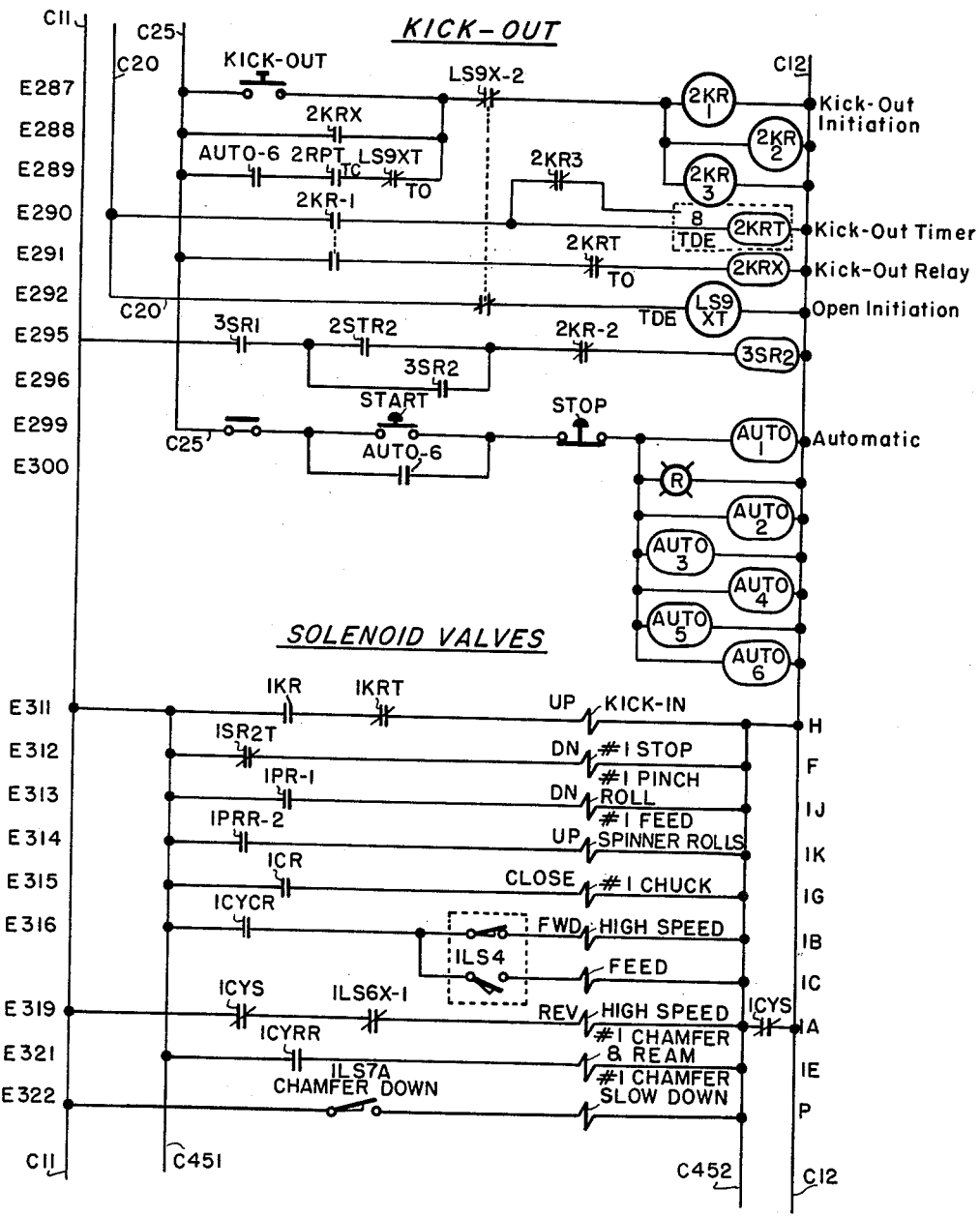
Figure 13H:
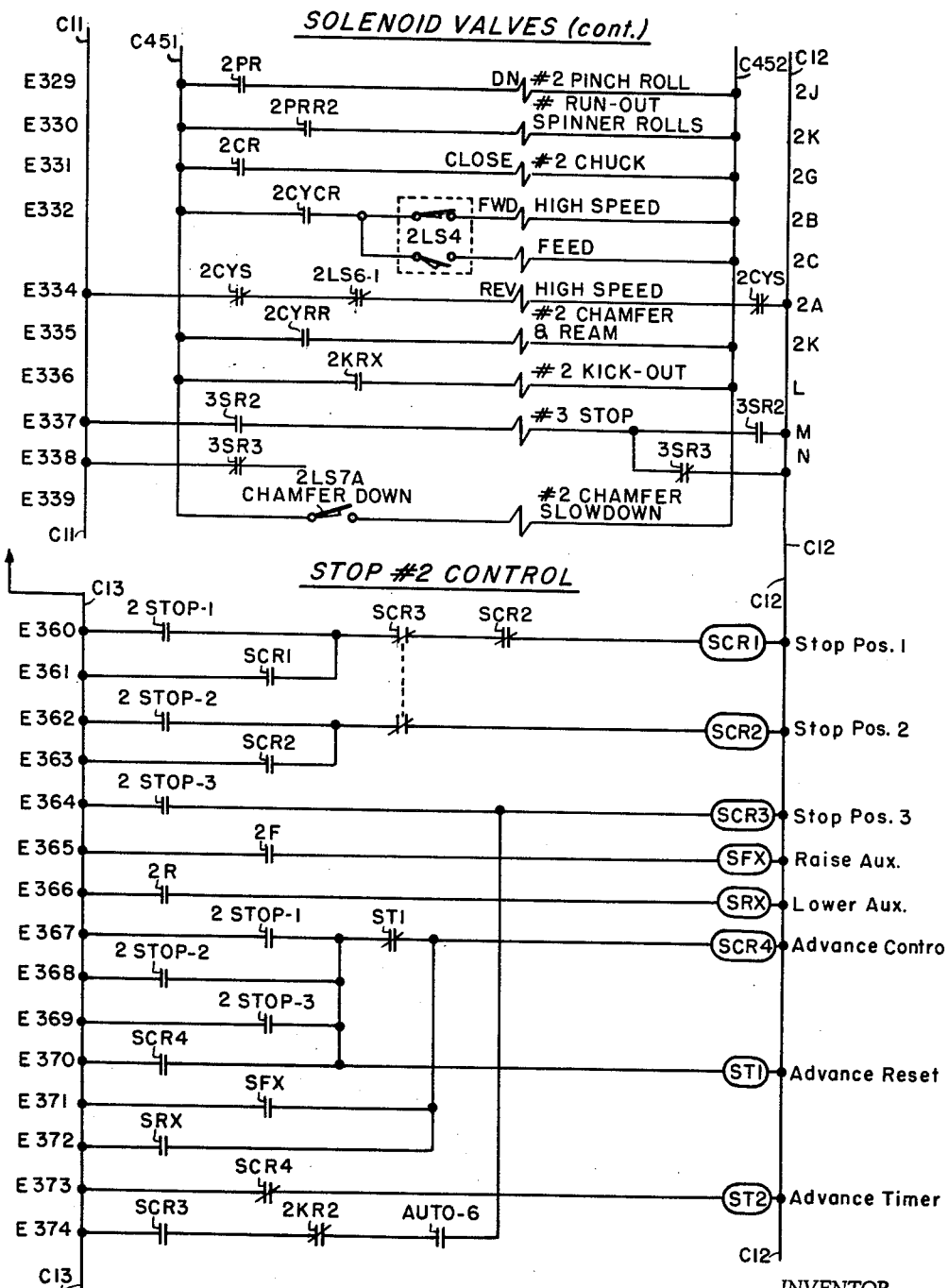

FIGURES 11 and 12 show a single machine 69 with two cut-off and work stations 70 and 71, one, 70, at an entry end of a rotatable barrel 72 of the machine and the other station 71 at the exit end thereof. This machine cuts pipe to length or into multiples and performs work operations such as chamfering and reaming on leading and trailing ends of the pipe and can be substituted for the first and second machines 2 and 3 and thereby use the pipe positioning device 4 by placing it so that the entry end of the barrel is opposite the exit end of the feed table 1 and the exit end of the barrel is opposite the entry end of the run-out table 5. The barrel defines a passageway 73 for travel of the pipe through the machine in a direction indicated by arrow 745 (FIGURE 11) and a motor 75 and belt and chain drive 76 connected to the barrel rotate it about its longitudinal axis.

Mounted upon the entry end of the barrel for rotation therewith is a first chuck 77 and upon the exit end of the barrel a second chuck 78 each with jaws 80 for engaging and supporting the pipe. Beneath the barrel is an air cylinder 81 which operates a first linkage arrangement 82 connected to the first chuck 77 for opening and closing its jaws and which operates a second linkage arrangement 83 connected to the second chuck for opening and closing its jaws.

Adjacent the exit end of the barrel at the second station 71 and mounted upon the machine is a machine stop 84 which is lowered into a pipe location position to engage the leading end of the pipe to position it for end cropping and then raised therefrom through operation of an air cylinder 85. Engagement of the leading end of the pipe disposes it for cropping or for cutting a multiple therefrom. Also, at the station 71 is a cut-off tool 86 similar to cut-off tools 17 and 21 and operated by a cylinder motor 87 to effect cutting the pipe. This cut-off tool is mounted upon a frame of the machine.

Additionally, at station 71 and connected to the machine is a reaming tool and chamfering tool combination 88 disposed for work upon the leading end of the pipe or multiple and operated by a motor cylinder (not shown) similar to motor cylinders 23 and 24.

At the station 70 is another cut-off tool similar to the tool 86 and operated by a cylinder motor for cropping the trailing end of the pipe or a multiple and for cutting multiples. Also, at the station 70 and affixed to the machine is a second reaming tool and chamfering tool combination positioned for work upon the trailing end of the pipe or a multiple and similar to the reaming tool and chamfering tool combination 88.

To cut, ream and chamfer pipe or a multiple on the machine 69, its stop 84 is lowered to pipe locating position to engage the leading end of the pipe which travels through the barrel. After engagement, the stop is raised and the chucks are closed. Next, the pipe is cropped, followed by reaming and chamfering its leading end at station 71. Then the chucks open and the pipe is advanced into engagement with a selected stop in intercept position on the run-out table. Engagement of the leading end of the pipe with the selected stop locates a given portion thereof at the station 70 for cutting a multiple therefrom. Subsequent to cutting the multiple, the remainder is backed away from the cut-off tool at the station 70 and the trailing end of the multiple reamed and chamfered by the reaming tool and chamfering tool combination at this station 70. Thereafter, the pipe is advanced further along the run-out table to remove its trailing end from the machine after which the pipe is kicked out of the run-out table.

Where reaming and chamfering the trailing end of the multiple is not required, then the cut-off operation of the multiples can be performed at the second station 71.

The remainder now is advanced past the first station 70 to the second station 71 where its leading end is reamed and chamfered and then is moved ahead into engagement with the selected stop to bring its trailing end to the first station where cropping takes place followed by reaming and chamfering the trailing end.

The distance between the points of engagement of the tools with the pipe at station 70 and at station 71 is equal to the distance between two successive stops of the run-out table 5.

My invention has important advantages which include ability to reduce the number and time of handling operations when cutting pipe to multiples and performing a work operation upon leading and/or trailing ends thereof. Additionally, it requires less handling apparatus than cut-off machines heretofore used and in some instances, provides a greater production than previously used cut-off and reaming and chamfering installations.

While I have shown and described preferred embodiments of my invention, it is to be understood that it may be otherwise embodied within the scope of the following claims.

I claim:

1. Apparatus for locating at least one elongated article relative to at least first and second stations spaced apart from each other comprising a run-out table, motor driven means for conveying said article therealong, a plurality of spaced apart movable stop members disposed along said table, motor means connected to said stop members for moving selected ones into and out of an intercept position in a path of travel of said article along said table for engagement therewith, control means operatively connected to said motor means for regulating movement of selected stop members into and out of said intercept position, selector means connected to said control means for determining which of said stop members is moved into said intercept position to locate said article relative to said first station, said control means including a first initiating means for operating said motor means to move a first selected stop member out of intercept position upon movement of said article thereto and to advance a second stop member closer to an exit end of said table into intercept position, a second initiating means responsive to completion of an operation upon said article at said first station for operating said motor driven means to advance said article to said second stop member in intercept position to locate said article relative to said second station and for operating said motor means to move said second stop member out of intercept position upon movement thereto of said article.

2. The apparatus of claim 1 characterized by said stop members being spaced apart from each other substantially an equal amount and by all of said stop members being mounted upon support means which is movable to given locations along a route substantially parallel to said path of travel of said article.

3. The apparatus of claim 2 characterized by said support means being a rotatable shaft extending substantially parallel to and being spaced from said path of travel, each of said stop members occupying a different radial position therearound and being spaced apart radially substantially an equal amount, and by said motor means being operatively connected to said shaft.

4. The apparatus of claim 3 characterized by said stop members having a spacing arrangement along the length of said shaft such that from one end to the other end each successive stop member is spaced apart lengthwise thereof and advanced radially said equal amount relative to its preceding stop member.

5. The apparatus of claim 1 characterized by a third initiating means responsive to completion of an operation upon said article at said second station for operating said motor driven means to advance said article from said second station.

6. The positioning apparatus of claim 5 including a motor operated kick-out means positioned along said run-out table for engaging an article thereon and removing same therefrom, a kick-out initiating means connected to said control means and to said motor operated kick-out means and responsive to the trailing end of said article passing a given location on said run-out table to actuate said kick-out means to remove said article from said table and to return said first selected stop member to its intercept position.

7. The apparatus of claim 1 characterized by said selector means including a selector potentiometer connected to a matching potentiometer.

8. Apparatus for cutting an elongated article to length or into multiples and performing at least one work operation upon leading and trailing ends of said article or at least one of said multiples comprising first and second stations spaced apart from each other and disposed in tandem along an endwise path of travel of said article such that said article encounters said first station and then said second station, said first station having a cut-off tool and at least one work tool operable to engage said article or a multiple thereof, said second station having at least one of a cut-off and a work tool operable to engage said article or a multiple thereof, article positioning means on an exit side of said second station and disposed along said path of travel for locating a given portion of said article at at least one of said first and second stations, said article positioning means comprising a run-out table, motor driven means for conveying said article therealong, a plurality of spaced apart movable stop members disposed along said table, motor means connected to said stop members for moving selected ones into and out of an intercept position in said path of travel of said article for engagement therewith to locate said article at said stations and control means operatively joined to said motor means for regulating movement of selected stop members into and out of intercept position.

9. The apparatus of claim 8 characterized by said work tool at said first station being disposed for operation upon a leading end of said article and a multiple length thereof and by said work tool at said second station being disposed for operation upon a trailing end of said article and a multiple length thereof.

10. The apparatus of claim 8 characterized by said work tool at said first station being disposed for operation upon a trailing end of said article and a multiple length thereof and by said work tool at said second station being disposed for operation upon a leading end of said article and a multiple length thereof.

11. The apparatus of claim 8 characterized by said stop members being spaced apart from each other an amount substantially equal to that between said first and second stations, and by all of said stop members being mounted upon support means which is movable to given locations along a route substantially parallel to said path of travel of said article.

12. The apparatus of claim 11 characterized by selector means for determining which of said stop members is moved into and out of said intercept position.

13. The apparatus of claim 11 characterized by said support means being a rotatable shaft extending substantially parallel to and being spaced from said path of travel, each of said stop members occupying a different radial position therearound and being spaced apart radially substantially an equal amount, and by said motor means being operatively connected to said shaft.

14. The apparatus of claim 13 characterized by said stop members having a spacing arrangement along the length of said shaft such that from one end to the other end each successive stop member is spaced apart lengthwise and advanced radially said equal amount relative to its preceding stop member.

15. The apparatus of claim 14 characterized by selector means for determining which of said stop members is moved into and out of said intercept position.

16. The apparatus of claim 8 characterized by said stop members being spaced apart from each other an amount substantially equal to that between said first and second stations.

17. The apparatus of claim 9 characterized by said stop members being spaced apart from each other an amount substantially equal to that between said first and second stations.

18. The apparatus of claim 9 characterized by said control means being connected to said cut-off and work tools and said motor driven means for regulating operation thereof and including a first initiating means to effect operation of said cut-off tool of said first station to cut off a first length from said article upon movement of its leading end to a first selected stop member substantially in intercept position, thereby forming said first length and a remainder of said article and to move said first selected stop member out of intercept position and move the next stop member towards an exit end of said run-out table into intercept position, a second initiating means to effect operation of said motor driven means to advance said first length along said table after cutting off said first length and to effect operation of said work tool at said first station upon a leading end of said remainder upon removal of the trailing end of said first length from said first station, a third initiating means to effect operation of said tool of said second station upon movement of said first length to said next stop member for work upon a trailing end of said length and to move said next stop member out of intercept position to permit travel of said length therebeyond.

19. The apparatus of claim 18 characterized by said control means including a fourth initiating means to effect operation of said tool at said second station for work upon a trailing end of said remainder upon movement of the trailing end of said remainder to said second station.

20. The apparatus of claim 18 characterized by a motor operated kick-out means positioned along said run-out table for engaging a length thereon and removing same therefrom, a kick-out initiating means connected to said control means and to said motor operated kick-out means and responsive to the trailing end of said length passing a given location on said run-out table to actuate said kick-out means to remove said article from said table and to return said first selected stop member to intercept position.

21. The apparatus of claim 9 characterized by said control means being connected to said cut-off and work tools and said motor driven means for regulating operation thereof and including a first initiating means to effect operation of said cut-off tool of said first station to cut off a first length from said article when its leading end is at a first selected stop member substantially in intercept position thereby forming said first length and a remainder of said article and to move said first selected stop member out of intercept position and said next stop member towards an exit end of said run-out table into intercept position, a second initiating means to effect operation of said motor driven means to advance said first length along said table after completion of cutting off said first length, to effect operation of said work tool at said first station for work upon a leading end of said remainder upon removal of the trailing end of said first length from said first station and to effect operation of said tool at said second station for work upon said trailing end of said first length.

22. The apparatus of claim 21 characterized by said control means including means adjacent said first machine and responsive to exit of said remainder from said first station to effect operation of said tool at said second machine for work upon a trailing end of said remainder.

23. The apparatus of claim 22 characterized by a motor operated kick-out means positioned along said run-out table for engaging a length thereon and removing same therefrom, a kick-out initiating means connected to said control means and to said motor operated kick-out means and responsive to the trailing end of said length passing a given location on said run-out table to actuate said kick-out means to remove said article from said table and to return said first selected stop member to intercept position.

24. The apparatus of claim 16 characterized by said control means being connected to said cut-off and work tools and said motor driven means for regulating operation thereof and including a first initiating means to effect operation of said cut-off tool of said first station to cut off a first length from said article upon movement of its leading end to a first selected stop member substantially in intercept position, thereby forming said first length and a remainder of said article and to move said first selected stop member out of intercept position and move the next stop member towards an exit end of said run-out table into intercept position, a second initiating means to effect operation of said motor driven means to advance said first length along said table after completion of cutting off said first length and to effect operation of said work tool at said first station upon a leading end of said remainder upon removal of the trailing end of said first length from said first station, a third initiating means to effect operation of said tool of said second station upon movement of said first length to said next stop member for work upon a trailing end of said first length and to move said next stop member out of intercept position to permit travel of said length therebeyond.

25. The apparatus of claim 24 characterized by said control means including a fourth initiating means to effect operation of said tool at said second station for work upon a trailing end of said remainder upon movement of the trailing end of said remainder to said second station.

26. The apparatus of claim 25 characterized by a motor operated kick-out means positioned along said run-out table for engaging a length thereon and removing same therefrom, a kick-out initiating means connected to said control means and to said motor operated kick-out means and responsive to the trailing end of said length passing a given location on said run-out table to actuate said kick-out means to remove said article from said table and to return said first selected stop member to intercept position.

27. The apparatus of claim 16 characterized by said control means being connected to said cut-off and work tools and said motor driven means for regulating operation thereof and including a first initiating means to effect operation of said cut-off tool of said first station to cut off a first length from said article upon movement of its leading end to a first selected stop member substantially in intercept position thereby forming said first length and a remainder of said article and to move said first selected stop member out of intercept position and said next stop member towards an exit end of said run-out table into intercept position, a second initiating means to effect operation of said motor driven means to advance said first length along said table after cutting off said first length, to effect operation of said tool at said first station upon a leading end of said remainder upon removal of the trailing end of said first length from said first station and to effect operation of said tool at said second station for work upon a trailing end of said length.

28. The apparatus of claim 18 characterized by motor driven conveyor means for advancing said article to said first station, by said control means being connected to said motor conveyor means and by said control means including a crop initiating means to effect operation of said cut-off tool of said first station to crop a leading end portion of said article to form a leading end of said article upon movement of said leading end portion to said first station, to effect operation of said work tool at said first station upon said leading end, and to actuate said motor conveyor means after said crop to advance said leading end from said first station.

29. The apparatus of claim 21 characterized by motor driven conveyor means for advancing said article to said first station, by said control means being connected to said motor conveyor means and by said control means including a crop initiating means to effect operation of said cut-off tool of said first station to crop a leading end portion of said article to form a leading end of said article upon movement of said leading end portion to said first station, to effect operation of said work tool at said first station upon said leading end, and to actuate said motor conveyor means after said crop to advance said leading end from said first station.

30. The apparatus of claim 24 characterized by motor driven conveyor means for advancing said article to said first station, by said control means being connected to said motor conveyor means and by said control means including a crop initiating means to effect operation of said cut-off tool of said first station to crop a leading end portion of said article to form a leading end of said article upon movement of said leading end portion to said first station, to effect operation of said work tool at said first station upon said leading end, and to actuate said motor conveyor means after said crop to advance said leading end from said first station.

31. Apparatus for cutting pipe, tube, or the like, to length or into multiple lengths and performing at least one of reaming and chamfering operations upon leading and trailing ends of said article or at least one of said multiple lengths comprising first and second machines spaced apart from each other and disposed in tandem along an endwise path of travel of said pipe such that said pipe encounters said first machine and then said second machine, said first machine having a cut-off tool and at least one of a first reaming tool and a first chamfering tool disposed for operation upon a leading end of said pipe and a multiple length thereof, said second machine having at least one of a cut-off tool, a second reaming tool, a second deburring tool and a second chamfering tool disposed for operation upon a trailing end of said pipe and a multiple length thereof, first motor means connected to said cut-off, reaming and chamfering tools of said first machine for actuating same, second motor means connected to said cut-off, reaming and chamfering tools of said second machine for actuating same, pipe positioning means on an exit side of said second machine and disposed along said path of travel for locating a given portion of said pipe at at least one of said first and second machines, said pipe positioning means comprising a run-out table, motor driven means for conveying said pipe therealong, a plurality of spaced apart movable stop members disposed along said table, third motor means connected to said stop members for moving selected ones into and out of an intercept position in said path of travel of said pipe for engagement therewith to locate said pipe at said machines, and control means operatively joined to said first, second and third motor means and to said motor driven means for regulating operation of said first and second motor means and said motor driven means and as to said third motor means for regulating movement of selected stop members into and out of said intercept position.

32. The apparatus of claim 31 characterized by said control means including a first initiating means for operating said first motor means to actuate said cut-off tool of said first machine to cut off a first length from said pipe upon movement of its leading end to a first selected stop member substantially in intercept position, thereby forming said first length and a remainder of said pipe, and for moving said first selected stop member out of intercept position and moving the next stop member towards an exit end of said run-out table into intercept position, a second initiating means for actuating said motor driven means to advance said first length along said table and said first motor means to operate at least one of said chamfering and reaming tools to work upon a leading end of said remainder when the trailing end of said length has left said first machine, a third initiating means for operating said second motor means upon movement of said length to said next stop member to actuate at least one of said chamfer and reaming tools for work upon a trailing end of said length, and to move said next stop member out of intercept position to permit travel of said length therebeyond.

33. The apparatus of claim 32 characterized by said control means including a fourth initiating means for operating said second motor means to actuate at least one of said cut-off, second reaming and second chamfering tools at said second machine for work upon a trailing end of said remainder upon movement of the trailing end of said remainder to said second machine.

34. The apparatus of claim 31 characterized by said control means including first initiating means for operating said first motor means to actuate said cut-off tool of said first machine and cut off a first length from said pipe upon movement of its leading end to first selected stop member substantially in intercept position, thereby forming said first length and a remainder of said pipe, and for moving said first selected stop member out of intercept position and moving the next stop member towards an exit end of said run-out table into intercept position, a second initiating means for actuating said motor driven means to advance said first length along said table and said first motor means to operate at least one of said chamfering and reaming tools to work upon a leading end of said remainder upon removal of the trailing end of said first length from said first machine, and for operating said second motor means to actuate at least one of said chamfer and reaming tools of said second machine for work upon a trailing end of said length upon movement of said first length to said next stop member.

35. The apparatus of claim 34 characterized by said control means including means adjacent said first machine and responsive to exit of said remainder from said first machine to operate said second motor means to actuate at least one of said cut-off, second reaming and second chamfering tools at said second machine for work upon a trailing end of said remainder.

36. The apparatus of claim 35 characterized by a motor operated kick-out means positioned along said run-out table for engaging a length thereon and removing same therefrom, a kick-out initiating means connected to said control means and to said motor operated kick-out means and responsive to the trailing end of said length passing a given location on said run-out table to actuate said kick-out means to remove said article from said table and to return said first selected stop member to intercept position.

37. First and second elongated article cut-off machines each having an entry and an exit side and a cut-off and at least one work tool, said machines being on opposite sides of a space therebetween with their cut-off and work tools on said opposite sides of said space and being a tandem along an endwise path of travel of said article such that said article encounters said first machine and then said second machine, apparatus on the exit side of said second machine and along said path of travel for positioning said article at a station of at least one of said machines, said apparatus comprising a run-out table having means for conveying said article therealong, a plurality of spaced apart movable stop members disposed along said table, motor means connected to said stop members for moving selected ones into and out of an intercept position in said path of travel of said article for engagement therewith to locate said article at said station, control means operatively joined to said motor means for regulating movement of selected stop members into and out of said intercept position.

38. In a method of cutting an elongated article into multiple lengths and performing at least one work operation upon leading and trailing ends of at least some of said multiple lengths, the invention comprising advancing said article along an endwise path of travel to bring its leading end to a first station, at said first station performing upon said leading end at least one work operation, then effecting a further advancement of said article along said path of travel so that its leading end passes through a second station spaced apart from said first station and in tandem therewith, said further advancement being an amount equal to a first length to be cut from said article, at said first station cutting off said first length from said article to produce a remainder of said article, advancing said first length along said path of travel to bring its trailing end to said second station, at said second station performing at least one work operation upon said trailing end of said first length, at said first station performing at least one work operation upon the leading end of said remainder of said article, advancing said first length from said second station and advancing said remainder from said first station further along said path of travel so that the leading end thereof passes through said second station, terminating said advancement of said remainder at a point such that the trailing end of a second length to be cut is at one of said first and second stations, cutting off said second length from said remainder at said one of said first and second stations, and performing at least one work operation upon the trailing end of the second length at said second station.

39. The invention of claim 38 characterized by said article being pipe, tubing, or the like, and said work operation including at least one of deburring, reaming and chamfering.

40. The method of claim 38 characterized by producing from said remainder at least one length in addition to said first length wherein said additional length is cut off from said remainder at said first station, wherein its leading end is subjected to at least one work operation at said first station and wherein its trailing end is subjected to at least one work operation at said second station, and by producing the last length from that portion of said article remaining after production of said at least one additional length in the same manner as said second length.

41. In a method of cutting an elongated article into multiple lengths and performing at least one work operation upon leading and trailing ends of at least some of said multiple lengths, the invention comprising advancing said article along an endwise path of travel to bring its leading end to a first station, at said first station performing upon said leading end at least one work operation, then effecting a further advancement of said article along said path of travel so that its leading end passes through a second station spaced apart from said first station and in tandem therewith, said further advancement being an amount equal to a first length to be cut from said article, at said first station cutting off said first length from said article to produce a remainder of said article, advancing said first length along said path of travel to bring its trailing end to said second station, at said second station performing at least one work operation upon said trailing end of said first length, at said first station performing at least one work operation upon the leading end of said remainder of said article, advancing said first length from said second station and advancing said remainder from said first station further along said path of travel so that the leading end thereof passes through said second station, terminating said advancement of said remainder at a point such that the trailing end of a second length to be cut is at said second station, cutting off said second length from said remainder at said second station, and performing at least one work operation upon the trailing end of the second length at said second station.

42. In a method of cutting an elongated article into multiple lengths and performing at least one work operation upon leading and trailing ends of at least some of said multiple lengths, the invention comprising advancing said article along an endwise path of travel to take its leading end on past a first station a distance equal to a first length to be cut from said article, at said first station cutting off said first length to produce a remainder of said article, advancing said first length along said path of travel to bring its trailing end to a second station spaced apart from said first station and in tandem therewith, at said second station performing at least one work operation upon said trailing end of said first length, at said first station performing at least one work operation upon the leading end of said remainder.

43. The invention of claim 42 characterized by advancing said first length from said second station and said remainder from said first station to bring the trailing end of said remainder to said second station, performing a work operation upon the trailing end of said remainder at said second station.

44. The invention of claim 42 characterized by advancing said first length from said second station and by advancing said remainder an amount to bring a trailing end portion thereof to one of said first and second stations, cutting a crop off said trailing end portion at one of said first and second stations to produce a second length.

45. The invention of claim 44 characterized by performing a work operation upon the trailing end of said second length at said second station.

46. In a method of cutting an elongated article into multiple lengths and performing at least one work operation upon leading and trailing ends of at least some of said lengths, the invention comprising advancing said article along an endwise path of travel to bring its leading end to a first station, at said first station performing upon said leading end at least one work operation, effecting a further advancement of said article along said path of travel to carry said leading end on past said first station to bring a portion of said article to a second station spaced apart from said first station in tandem therewith and located on the entry side of said first station relative to the direction of said advancement of said article, at said second station cutting off a first length from said article to produce said first length and a remainder of said article, performing at said second station at least one work operation upon a trailing end of said first length, conveying said first length from said second station and on past said first station, advancing said remainder to bring its leading end to said first station, performing at least one work operation upon said leading end of said remainder at said first station, advancing the leading end of said remainder on past said first station to bring its trailing end to said second station and performing at least one work operation upon said trailing end of said remainder at said second station.

47. In a method of cutting an elongated article into multiple lengths and performing at least one work operation upon leading and trailing ends of at least some of said lengths, the invention comprising advancing said article along an endwise path of travel to bring its leading end to a first station, at said first station performing upon said leading end at least one work operation, effecting a further advancement of said article along said path of travel to carry said leading end on past said first station to bring a portion of said article to a second station spaced apart from said first station, in tandem therewith and located on the entry side of said first station relative to the direction of said advancement of said article, at said second station cutting off a first length from said article to produce said first length and a remainder of said article, performing at said second station at least one work operation upon a trailing end of said first length, conveying said first length from said second station and on past said first station, advancing said remainder to bring its leading end to said first station, performing at least one work operation upon said leading end of said remainder at said first station, advancing the leading end of said remainder on past said first station to bring its trailing end to said second station and cutting a crop off the trailing end of said remainder at said second station to produce a second length.

48. In a method of cutting an elongated article into multiple lengths and performing at least one work operation upon leading and trailing ends of at least some of said lengths, the invention comprising advancing said article along an endwise path of travel to bring a portion of its length to a first station, at said first station cutting off a first length to form said first length and a remainder, performing a work operation on the trailing end of said first length at said first station, advancing said first length on past said first station and then on past a second station spaced apart from said first station and in tandem therewith, advancing a leading end of said remainder to said second station and there performing a work operation upon said leading end.

49. The invention of claim 48 characterized by cutting a crop off of the trailing end of said remainder at said first station to produce a second length.

50. The invention of claim 49 characterized by at said first station performing a work operation upon the trailing end of said second length.

51. In a method of cutting an elongated article into multiple lengths and performing at least one work operation upon leading and trailing ends of at least some of said lengths, the invention comprising advancing said article along an endwise path of travel to bring its leading end to a first station, at said first station performing upon said leading end at least one work operation, effecting a further advancement of said article along said path of travel to carry said leading end on past said first station to bring a portion of said article to a second station spaced apart from said first station, in tandem therewith and located on the entry side of said first station relative to the direction of said advancement of said article, at said second station cutting off a first length from said article to produce said first length and a remainder of said article, backing off said remainder from said second station and performing at said second station at least one work operation upon a trailing end of said first length, conveying said first length from said second station and on past said first station, advancing said remainder to bring its leading end to said first station, performing at least one work operation upon said leading end of said remainder at said first station, advancing the leading end of said remainder on past said first station to bring its trailing end to said second station and performing at least one work operation upon said trailing end of said remainder at said second station.

52. In a method of cutting an elongated article to a given length and performing at least one work operation upon the leading and trailing ends of said length, the invention comprising advancing said article along an endwise path of travel to bring a leading end portion to a first station, at said first station cropping said leading end portion to form a leading end of said given length and performing a work operation upon said leading end at said first station, advancing said leading end on past said first station and along said path of travel to bring a trailing end portion of said article to a second station spaced apart from said first station and in tandem therewith, at said second station cropping the trailing end portion of said article to form a trailing end of said given length and performing a work operation upon said trailing end at said second station.

53. First and second elongated article cut-off machines each having an entry and an exit side and a cut-off tool and at least one work tool, said machines being on opposite sides of a space therebetween with their cut-off and work tools on said opposite sides of said space and being in tandem along an endwise path of travel of said article such that said article encounters said first machine and then said second machine, said work tool of said first machine being disposed for operation upon a leading end of said article, said work tool of said second machine being disposed for operation upon a trailing end of said article, apparatus on the exit side of said second machine and along said path of travel for positioning said article at a station of at least one of said machines, said apparatus comprising a run-out table and a means for conveying said article therealong, at least one movable stop member disposed along said table, motor means connected to said stop member for moving same into and out of an intercept position in said path of travel of said article for engagement therewith to locate said article at said station, control means operatively connected to said motor means for regulating movement of said stop member into and out of said intercept position.

54. The invention of claim 38 characterized by rotating said elongated article and lengths cut therefrom about their longitudinal axes while cutting off and while performing said work operations.

55. The invention of claim 39 characterized by rotating said elongated article and lengths cut therefrom about their longitudinal axes while cutting off and while performing said deburring, reaming and chamfering.

56. The invention of claim 41 characterized by rotating said elongated article and lengths cut therefrom about their longitudinal axes while cutting off and while performing said work operations.

57. The invention of claim 42 characterized by rotating said elongated article and lengths cut therefrom about their longitudinal axes while cutting off and while performing said work operations.

58. The invention of claim 43 characterized by rotating said elongated article and lengths cut therefrom about their longitudinal axes while cutting off and while performing said work operations.

59. In a method of cutting an elongated article into multiple lengths and performing at least one work operation upon leading and trailing ends of at least some of said lengths, the invention comprising advancing said article along an endwise path of travel to move its leading end past a first station and to bring its leading end to a second station spaced apart from said first station and in tandem therewith, at said second station performing upon said leading end at least one work operation, effecting a further advancement of said article along said path of travel to carry said leading end on past said second station to bring a portion of said article to said first station, at said first station cutting off a first length from said article to produce said first length and a remainder of said article, performing at said first station at least one work operation upon a trailing end of said first length, conveying said first length from said first station and on past said second station, advancing said remainder to bring its leading end to said second station, performing at least one work operation upon said leading end of said remainder at said second station, advancing the leading end of said remainder on past said second station to bring its trailing end to said first station and performing at least one work operation upon said trailing end of said remainder at said first station.

60. In a method of cutting an elongated article into multiple lengths and performing at least one work operation upon leading and trailing ends of at least some of said lengths, the invention comprising advancing said article along an endwise path of travel to move its leading end past a first station and to bring its leading end to a second station spaced apart from said first station and in tandem therewith, at said second station performing upon said leading end at least one work operation, effecting a further advancement of said article along said path of travel to carry said leading end on past said second station to bring a portion of said article to said first station, at said first station cutting off a first length from said article to produce said first length and a remainder of said article, performing at said first station at least one work operation upon a trailing end of said first length, conveying said first length from said first station and on past said second station, advancing said remainder to bring its leading end to said second station, performing at least one work operation upon said leading end of said remainder at said second station, advancing the leading end of said remainder on past said second station to bring its trailing end to said first station and cutting a crop off the trailing end of said remainder at said first station to produce a second length.

61. In a method of cutting an elongated article into multiple lengths and performing at least one work operation upon leading and trailing ends of at least some of said lengths, the invention comprising advancing said article along an endwise path of travel to move its leading end past a first station and to bring its leading end to a second station spaced apart from said first station and in tandem therewith, at said second station performing upon said leading end at least one work operation, effecting a further advancement of said article along said path of travel to carry said leading end on past said second station to bring a portion of said article to said first station, at said first station cutting off a first length from said article to produce said first length and a remainder of said article, backing off said remainder from said first station and performing at said first station at least one work operation upon a trailing end of said first length, conveying said first length from said first station and on past said second station, advancing said remainder to bring its leading end to said second station, performing at least one work operation upon said leading end of said remainder at said second station, advancing the leading end of said remainder on past said second station to bring its trailing end to said first station and performing at least one work operation upon said trailing end of said remainder at said first station.

62. The invention of claim 59 characterized by rotating said elongated article and lengths cut therefrom about their longitudinal axes while cutting off and while performing said work operations.

63. The invention of claim 60 characterized by rotating said elongated article and lengths cut therefrom about their longitudinal axes while cutting off and while performing said work operations.

64. The invention of claim 48 characterized by rotating said elongated article and lengths cut therefrom about their longitudinal axes while cutting off and while performing said work operations.

65. The invention of claim 61 characterized by rotating said elongated article and lengths cut therefrom about their longitudinal axes while cutting off and while performing said work operations.

66. The invention of claim 52 characterized by rotating said elongated article and lengths cut therefrom about their longitudinal axes while cutting off and while performing said work operations.

67. The method of claim 60 characterized by performing at least one work operation upon said trailing end of said second length at said second station.

References Cited in the file of this patent

UNITED STATES PATENTS

| | | |
|---|---|---|
| 456,882 | Brightman | July 28, 1891 |
| 585,764 | Jacobs | July 6, 1897 |
| 1,823,268 | Gordon | Sept. 15, 1931 |
| 1,852,831 | Young | Apr. 5, 1932 |
| 2,003,118 | Mirfield | May 28, 1935 |
| 2,656,588 | Ovshinsky | Oct. 27, 1953 |
| 2,729,879 | Sampson | Jan. 10, 1956 |
| 2,917,957 | Jarvis | Dec. 22, 1959 |
| 3,055,245 | McKay | Sept. 25, 1962 |